United States Patent
Advani et al.

(10) Patent No.: US 12,474,441 B2
(45) Date of Patent: Nov. 18, 2025

(54) REAL-TIME THZ SENSING USING TRUE TIME DELAY

(71) Applicant: Samsung Electronics Co., Ltd., Suwon-si (KR)

(72) Inventors: Siddharth K. Advani, Allen, TX (US); Shadi Abu-Surra, Plano, TX (US); Gang Xu, Allen, TX (US); Vishnu Vardhan Ratnam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 18/149,651

(22) Filed: Jan. 3, 2023

(65) Prior Publication Data
US 2023/0228844 A1    Jul. 20, 2023

Related U.S. Application Data

(60) Provisional application No. 63/301,319, filed on Jan. 20, 2022, provisional application No. 63/301,781, filed on Jan. 21, 2022.

(51) Int. Cl.
G01S 7/282    (2006.01)
G01S 7/00    (2006.01)
(Continued)

(52) U.S. Cl.
CPC .............. *G01S 7/282* (2013.01); *G01S 7/006* (2013.01); *G01S 7/415* (2013.01); *G01S 13/582* (2013.01);
(Continued)

(58) Field of Classification Search
CPC .......... G01S 7/282; G01S 7/006; G01S 7/415; G01S 13/582; G01S 13/426;
(Continued)

(56) References Cited

U.S. PATENT DOCUMENTS 7,180,447 B1 * 2/2007 Jacomb-Hood .......... H01Q 3/36
                                                        342/373
10,476,154 B2    11/2019 Doane et al.
(Continued)

FOREIGN PATENT DOCUMENTS

| CN | 110764158 A | 2/2020 |
| CN | 113381818 A | 9/2021 |
| CN | 111193560 B | 10/2021 |

OTHER PUBLICATIONS

J. Tan and L. Dai, "Wideband Beam Tracking Based on Beam Zooming for THz Massive MIMO," GLOBECOM 2020—2020 IEEE Global Communications Conference, Taipei, Taiwan, 2020, pp. 1-6 (Year: 2020).*

(Continued)

*Primary Examiner* — Vladimir Magloire
*Assistant Examiner* — Anna K. Gosling

(57) ABSTRACT

A method for real-time THz sensing using true time delay (TTD) is implemented by a base station and includes transmitting, by a transceiver that includes TDD elements and phase shifters configured in the transceiver, simultaneous frequency dependent (SFD) beams to scan an environment at a first granularity to detect a spatial cluster target. Each of the SFD beams corresponds to a different phase angle and different frequency. The method includes determining, among the SFD beams, a subset of beams that detected the spatial cluster target. The method includes beam switching, by the transceiver, using time division multiplexing (TDM) and a TDM bandwidth to scan a portion of the environment at phase angles corresponding to the subset of beams and at a second granularity finer than the first granularity. The method includes combining data received from the SFD beams, by multiple threads that concurrently process data received from the SFD beams.

20 Claims, 20 Drawing Sheets

(51) Int. Cl.
  *G01S 7/41*   (2006.01)
  *G01S 13/58*  (2006.01)
  *H04B 7/06*   (2006.01)

(52) U.S. Cl.
  CPC ....... *H04B 7/0617* (2013.01); *H04B 7/06952* (2023.05)

(58) Field of Classification Search
  CPC ................ G01S 13/003; G01S 13/347; G01S 2013/9316; G01S 13/282; H04B 7/0617; H04B 7/06952
  See application file for complete search history.

(56) References Cited

U.S. PATENT DOCUMENTS

| | | | |
|---|---|---|---|
| 11,032,842 | B2 | 6/2021 | Bai et al. |
| 11,258,575 | B2 | 2/2022 | Abedini et al. |
| 2011/0122026 | A1 | 5/2011 | DeLaquil et al. |
| 2015/0333811 | A1* | 11/2015 | Yu .......................... H01Q 3/26 370/329 |
| 2018/0014261 | A1* | 1/2018 | Miranda ............. H04W 52/367 |
| 2019/0268117 | A1 | 8/2019 | Nilsson et al. |
| 2021/0258053 | A1 | 8/2021 | Goransson et al. |
| 2021/0274466 | A1 | 9/2021 | Murray et al. |
| 2022/0077944 | A1 | 3/2022 | Zou et al. |

OTHER PUBLICATIONS

J. Tan and L. Dai, "Wideband Beam Tracking in THz Massive MIMO Systems," in IEEE Journal on Selected Areas in Communications, vol. 39, No. 6, pp. 1693-1710, Jun. 2021 (Year: 2021).*
International Search Report and Written Opinion issued Apr. 25, 2023 regarding International Application No. PCT/KR2023/000685, 9 pages.
Tan et al., "Wideband Beam Tracking in THz Massive MIMO Systems", arXiv:2012.04238v2, Aug. 2021, 17 pages.
Sarieddeen et al., "An Overview of Signal Processing Techniques for Terahertz Communications", arXiv:2005.13176v3, Aug. 2021, 38 pages.
Shih et al., "Fast Antenna and Beam Switching Method for mmWave Handsets with Hand Blockage", arXiv:2103.08151v1, Mar. 2021, 32 pages.
Giordani et al., "A Tutorial on Beam Management for 3GPP NR at mmWave Frequencies", arXiv:1804.01908v2, Nov. 2019, 22 pages.
Extended European Search Report issued Oct. 1, 2024 regarding Application No. 23743419.6, 6 pages.
Lin et al., "A 4-Element 800MHz-BW 29mW True-Time-Delay Spatial Signal Processor Enabling Fast Beam-Training with Data Communications", IEEE 47th European Solid State Circuits Conference (ESSCIRC 2021), Sep. 2021, pp. 287-290.

* cited by examiner

REAL-TIME THZ SENSING USING TRUE TIME DELAY

CROSS-REFERENCE TO RELATED APPLICATION(S) AND CLAIM OF PRIORITY

This application claims priority under 35 U.S.C. § 119(e) to U.S. Provisional Patent Application No. 63/301,319 filed on Jan. 20, 2022, and U.S. Provisional Patent Application No. 63/301,781 filed on Jan. 21, 2022. The above-identified provisional patent applications are hereby incorporated by reference in its entirety.

TECHNICAL FIELD

This disclosure relates generally to radar systems. More specifically, this disclosure relates to real-time terahertz (THz) sensing using true time delay.

BACKGROUND

With the advent of 5G wireless communication standards, commercial millimeter wavelength (mmWave) technology is becoming ubiquitous in today's mobile systems. Since these signals operate at frequencies in the high gigahertz (GHz) range, path loss during propagation is high.

SUMMARY

This disclosure provides real-time THz sensing using true time delay.

In one embodiment, a method for real-time THz sensing using true time delay is provided. The method is implemented by a base station. The method includes transmitting, by a transceiver that includes true time delay (TDD) elements and phase shifters configured in the transceiver, simultaneous frequency dependent (SFD) beams to scan an environment at a first granularity to detect a spatial cluster target in the environment. Each of the SFD beams corresponds to a different phase angle and different frequency. The method includes determining, among the SFD beams, a subset of beams that detected the spatial cluster target. The method includes beam switching, by the transceiver, using time division multiplexing (TDM) and a TDM bandwidth to scan a portion of the environment at phase angles that correspond to the subset of beams and at a second granularity finer than the first granularity. The method includes combining data received from the SFD beams, by multiple threads that concurrently process data received from the SFD beams.

In another embodiment, an electronic device for real-time THz sensing using true time delay is provided. The electronic device includes a transceiver that includes true time delay (TDD) elements and phase shifters. The electronic device includes a processor operably coupled to the transceiver. The processor is configured to transmit, via the transceiver, simultaneous frequency dependent (SFD) beams to scan an environment at a first granularity to detect a spatial cluster target in the environment. Each of the SFD beams corresponds to a different phase angle and different frequency. The processor is configured to determine, among the SFD beams, a subset of beams that detected the spatial cluster target. The processor is configured to beam switch, via the transceiver, using time division multiplexing (TDM) and a TDM bandwidth to scan a portion of the environment at phase angles that correspond to the subset of beams and at a second granularity finer than the first granularity. The processor is configured to combine data received from the SFD beams, by multiple threads that concurrently process data received from the SFD beams.

In yet another embodiment, a non-transitory computer readable medium comprising program code for real-time THz sensing using true time delay is provided. The computer program includes computer readable program code that when executed causes at least one processor to transmit, by a transceiver that includes true time delay (TDD) elements and phase shifters configured in the transceiver, simultaneous frequency dependent (SFD) beams to scan an environment at a first granularity to detect a spatial cluster target in the environment. Each of the SFD beams corresponds to a different phase angle and different frequency. The computer readable program code causes the processor to determine, among the SFD beams, a subset of beams that detected the spatial cluster target. The computer readable program code causes the processor to beam switch, by the transceiver, using time division multiplexing (TDM) and a TDM bandwidth to scan a portion of the environment at phase angles that correspond to the subset of beams and at a second granularity finer than the first granularity. The computer readable program code causes the processor to combine data received from the SFD beams, by multiple threads that concurrently process data received from the SFD beams.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
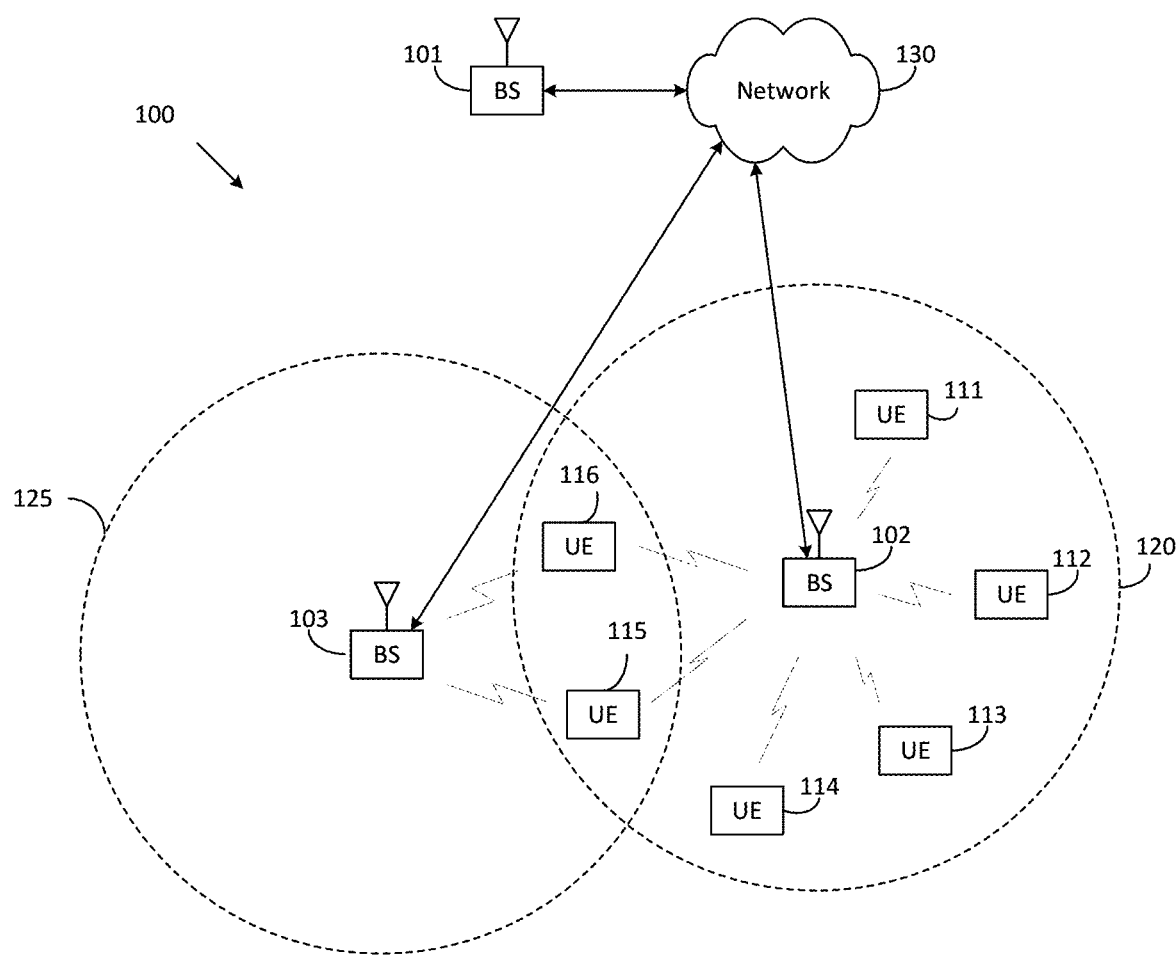
FIG. 1 illustrates an example wireless network according to this disclosure.

FIGS. 1 through 34, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

A reason for path loss during propagation of signals in the high GHz range is, as per Friis' Law, the isotropic (unity antenna gains) path loss ($P_t/P_r$). The isotropic path loss is inversely proportional to the square of the wavelength $\lambda$, as shown in Equation 1 where d is the antenna separation, and where $G_t$ and $G_r$ represent the transmit and receive antenna gains, respectively.

$$Pr = GtGr\left(\frac{\lambda}{4\pi d}\right)^2 Pt \quad (1)$$

In order to maintain the same SNR needed for reliable mobile communication, large antenna arrays are needed during deployment of cellular systems at these high frequencies. The RF-chain typically includes a set of power amplifiers (PA), low noise amplifiers (LNA) and high resolution analog to digital convertors (ADC) and digital to analog convertors (DAC). Earlier generations of cellular networks used a dedicated RF-chain for each antenna element in the antenna array. However, in the case of mmWave antenna arrays, this approach of using a dedicated RF-chain for each antenna element is an approach that is constrained by increasing hardware and power costs. For example, in the case of an 8 Tx-8 Rx mmWave system, the power budget would be upwards of 1 Watt.

Planar signals received by an antenna array need to be spatially combined in a manner such that interference from multipath propagation, noise emanating from ambient sources, thermal noise from hardware etc. is suppressed to maximize the signal to noise ratio (SNR). This signal processing technique is called "as beamforming" and can be expressed mathematically by Equation 2. In Equation 2, N represents the number of antenna elements, $x_i(k)$ represents the input signal received at antenna element i at time k, the complex weight applied to the input $x_i(k)$ is denoted as $w_i^*$., and y(k) represents the beam-combined output at time k.

$$y(k)=\Sigma_{i=1}^{N} w^*_i x_i(k) \quad (2)$$

This weighted linear combination of the input signal involves hardware and/or software signal processing techniques. Analog beamforming, which is supported in many standards (e.g., 3GPP 5G-NR, IEEE 802.11ad, and IEEE 802.11ay), uses digitally controlled phase shifters connected between the antennas and the RF chain. These phase shifters are adaptively tuned using digital signal processing techniques to steer the beams efficiently. However, analog beamforming has a number of limitations when used in advanced cellular systems, such as MIMO systems at high frequencies. In order to support MIMO at these frequencies, embodiments of this disclosure include hybrid beamforming techniques in which a combination of baseband precoding/combining and RF precoding/combining have proven to be highly effective.

As introduced above, at THz frequencies, due to high path loss, large antenna arrays to achieve reasonable antenna gain are desired. And so, the beams generated by these arrays are very narrow. On one hand, the narrow beams provide very fine spatial resolution. On the other hand, using analog narrow-beams, the radar sees only a small portion of the field-of-view (FoV), which means scanning the full FoV is going to be slow. This results in a low frame-rate, and as a consequence the radar will miss on detecting rapidly-changing activities. One option to speed up the scanning is to use fully digital beamforming, this allows the radar to scan multiple directions at the same time, however, the cost of implementing so many data-convertors is very high. Embodiments of the present disclosure present an alternative solution, which uses one digital chain (or few digital chains) and a TTD array.

Real-time sensing requires acquiring data very quickly (20-30 Hz) over a large FoV (180°). Since angular resolution improves linearly as the number of antennas increase, THz sensing will provide ample opportunity to detect and track targets at cm specific granularity in various environments.

This disclosure provides solutions that address various system-level problems when using TTD for real-time THz sensing. Embodiments of this disclosure include Hybrid (coarse/fine-grained) sensing: Configuring, in a first layer, TDD elements to scan an environment at a first level of granularity (e.g., coarser) to identify potential spatial cluster targets; Performing, at a second level of granularity (e.g., finer) in a second layer, beam switching using phase shifters at maximum bandwidth and targeted at the potential spatial cluster targets; Allocating equal or differential bandwidths based on number and type of target clusters. Additionally, embodiments of this disclosure include Real-time signal processing: Utilizing multiple threads to concurrently process data received from different sub-beams; Combining (e.g., stitching) data received from the different sub-beams operating at different frequencies. Also, embodiments of this disclosure include Intelligent scheduling of beams: Identify patterns (e.g., geo-location, time of day, etc.) associated with beam settings and scheduling different configurations based on information associated with workload demand.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

Figure 2:
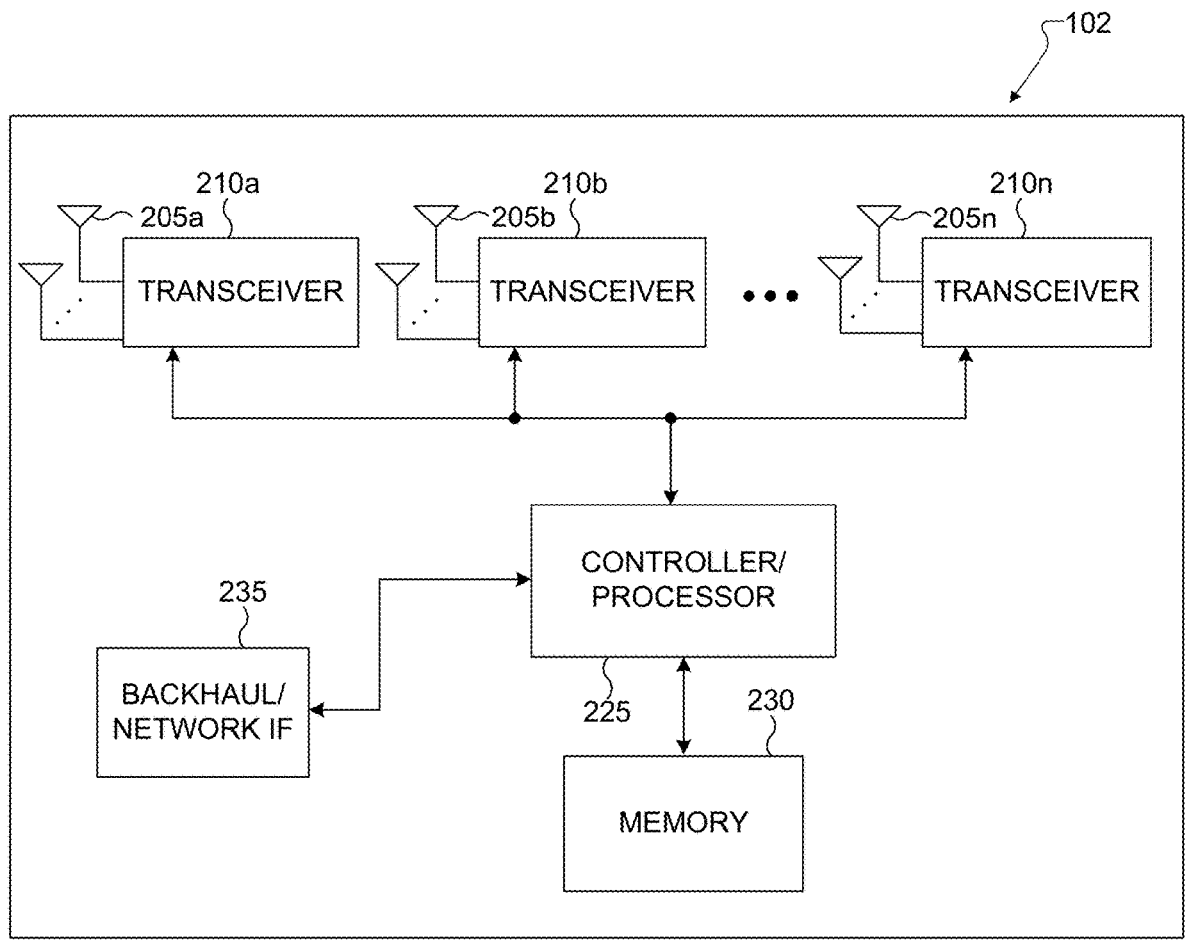
FIG. 2 illustrates an example gNodeB (gNB) according to this disclosure.
Figure 3:
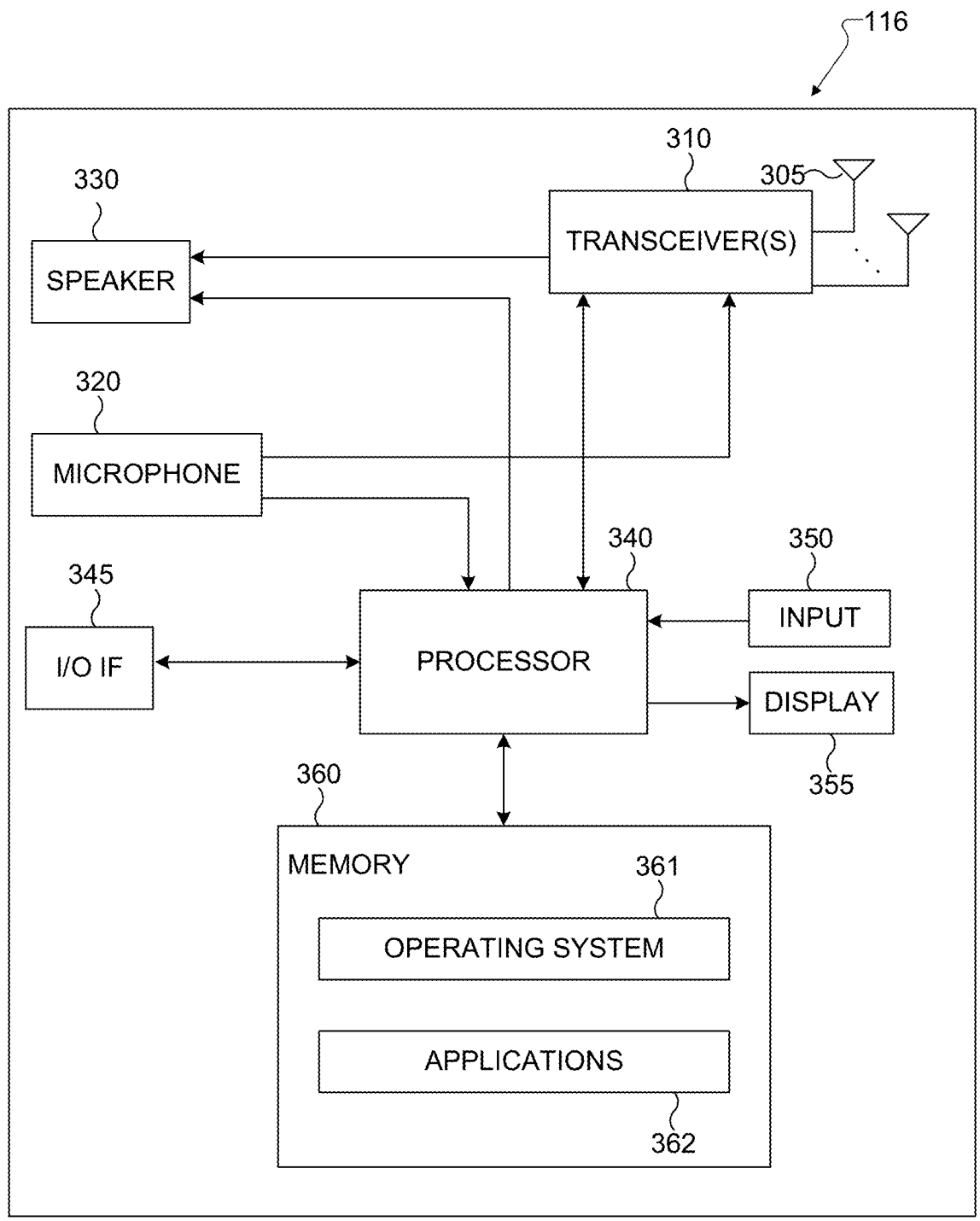
FIG. 3 illustrates an example user equipment (UE) according to this disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, the wireless network 100 enables a hybrid sensing policy that includes coarse-grained sensing followed by fine-grained sensing. The hybrid sensing policy is also referred to as two-layer because the coarse-grained sensing is executed as a first layer of sensing, and afterwards, fine-grained sensing is executed as a second layer of sensing. To execute the first layer of sensing, the TTD elements and phase shifters are configured to transmit simultaneous frequency dependent (SFD) beams to scan an environment at a coarse ganularity to detect a spatial cluster target in the environment. Data received from the SFD beams is combined by multiple threads that concurrently process data received from the SFD beams, for example, in order to determine a location of the detected spatial cluster target. In the second layer of sensing, beam switching is executed using time division multiplexing (TDM) and a TDM bandwidth to scan a portion of the environment at a fine ganularity based on the location of the detected spatial cluster target.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

As described in more detail below, the gNB 102 executes a hybrid sensing policy that includes coarse-grained sensing followed by fine-grained sensing. To execute the first layer of sensing, TTD elements and phase shifters are configured to transmit SFD beams to scan an environment at a coarse granularity to detect a spatial cluster target in the environment. Data received from the SFD beams is combined by multiple threads that concurrently process data received from the SFD beams, for example, in order to determine a location of the detected spatial cluster target. In the second layer of sensing, beam switching is executed using TDM and a TDM bandwidth to scan a portion of the environment at a fine granularity based on the location of the detected spatial cluster target.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

As described in more detail below, an electronic device, such as the UE 116, executes a hybrid sensing policy that includes coarse-grained sensing followed by fine-grained sensing. To execute the first layer of sensing, TTD elements and phase shifters are configured to transmit SFD beams to scan an environment at a coarse granularity to detect a spatial cluster target in the environment. Data received from the SFD beams is combined by multiple threads that concurrently process data received from the SFD beams, for example, in order to determine a location of the detected spatial cluster target. In the second layer of sensing, beam switching is executed using TDM and a TDM bandwidth to scan a portion of the environment at a fine granularity based on the location of the detected spatial cluster target.

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
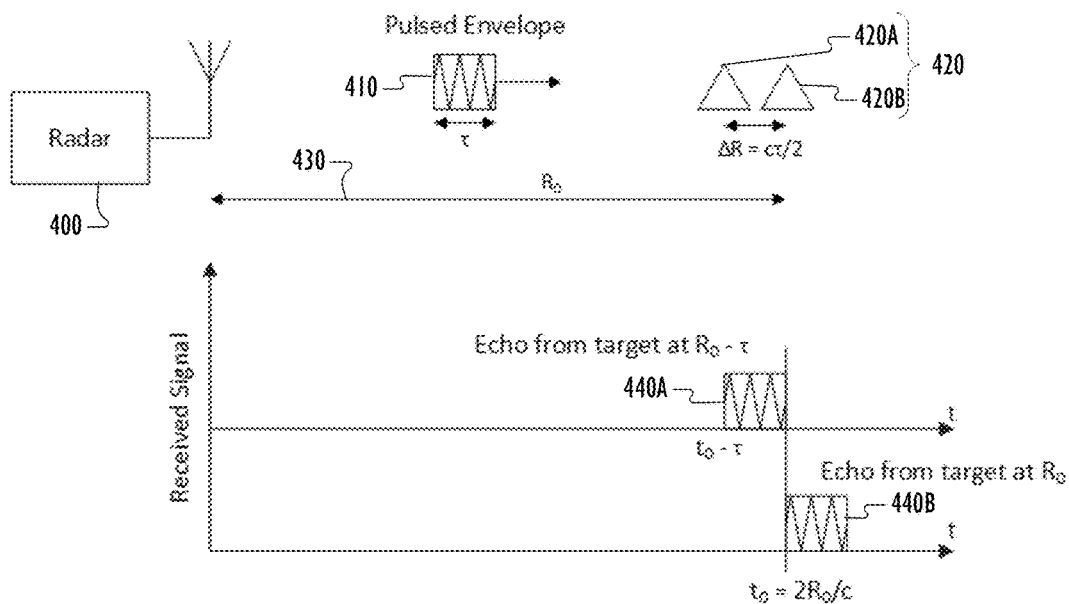
FIG. 4 illustrates a radar according to embodiments of this disclosure.

FIG. 4 illustrates a radar 400 according to embodiments of this disclosure. The embodiment of the radar 400 shown in FIG. 4 is for illustration only, and other embodiments could be used without departing from the scope of this disclosure. The radar 400 can be implemented by or similar to any of the transceivers 210a-210n of FIG. 2, or the transceivers 310 of FIG. 3. As one embodiment, the radar 400 is a monostatic radar. In another embodiment, the radar 400 could be a bi-static radar. The radar 400 can be a standalone electronic device or can be included as a component within the gNB 102 of FIG. 2 or UE 116 of FIG. 3.

The radar 400 transmits a signal 410 (for example, a monostatic radar signal) into the physical environment around the electronic device that includes the radar 400. A target object 420 is located a distance ($R_0$) 430 from the transmit antenna of the radar 400. In certain embodiments, the target object 420 corresponds to the objects that form the physical environment around the radar 400. For example, the target object 420 can be a cluster of multiple targets a first target 420a and a second target 420b. The range resolution $\Delta R$ of the radar 400 defines the minimum separation between two targets 420a-420b that can be determined by the radar 400 sensor. If the distance from the location of the first target 420a to the location of the second target 420b is equal to or greater than the range resolution $\Delta R$, then then the radar 400 can detect the two targets 420a-420b individually. If the locations of the two targets 420a-420b are closer to each other than the range resolution $\Delta R$, then then the radar 400 can detect the target object 420 as a single object.

The signal 410, which incident upon the target object 420, reflects off of the target object 420 such that a reflected signal is received by a receive antenna of the radar 400 as a delayed echo. The signal 410 represents one or many signals that can be transmitted from the radar 400 and reflected off of the target object 420. As a particular example, the signal 410 can be a channel estimation field (CEF) transmitted signal in accordance with an IEEE 802.11 communication standard. The signal 410 can be a single pulse, also referred to as a pulsed envelope, wherein $\tau$ denotes the pulse duration.

Various data can be determined based on one or more pulses transmitted by the radar 400. A sequence of pulses defines a burst, and a sequence of bursts defines a radar frame. The Channel Impulse Response (CIR) represents correlation of a received signal (e.g., delay echo) with CEF. A sample includes the I/Q tap of CIR [16'b, 16'b], which represents the 16 bit in-phase part of the CIR and 16-bit quadrature of the CIR. $N_{sample}$ denotes a number of samples per pulse. $N_{pulse}$ denotes a number of pulses per burst. $N_{burst}$ denotes a number of bursts per frame. The CIR length ($N_{taps}$) can be the signal length, such as 1280 samples in accordance with a current IEEE 802.11 communication standard. $T_{PRF}$ represents the pulse repetition interval, namely, the repetition frequency (e.g., periodicity) of every pulse. $T_{BRF}$ represents the burst repetition interval, namely, the repetition frequency of every burst.

The radar 400 can identify the information associated with the target object 420 based on receiving the multiple reflections of the signals 410. For example, at a time $t_0$-$\tau$, the radar 400 receives a first delay echo 440a as reflections from the first target 420a, which is located at a distance $R_0$-$\tau$ from the radar 400. At a time $t_0$ (where $t_0=2R_0/c$), the radar 400 receives a second delay echo 440b as reflections from the second target 420b, which is located at a distance $R_0$ from the radar 400. The radar 400 analyzes a time difference from when the signal 410 is transmitted and when the delayed echo is received. The time difference is also referred to as a delay, which indicates a delay between the transmit antenna transmitting the signal 410 and the receive antenna receiving the delayed echo after the signal 410 is reflected or bounced off of the target object 420. Based on the time difference, the radar 400 derives the distance 430 between the radar 400 and the target object 420. The distance 430 can change when the target object 420 moves while radar 400 is stationary. The distance 430 can change when the radar 400 moves while the target object 420 is stationary. Also, the distance 430 can change when the radar 400 and the target object 420 are both moving.

In one scenario, system parameters of the radar 400 includes a carrier frequency ($f_c$) of 140 GHz with a bandwidth of 4 GHz. The wavelength $\lambda$ is 2.14 millimeters, which is calculated based on the speed of light ($c=3\times10^8$ m/s) divided by the operating frequency ($f_c=140\times10^9$ Hz). The range resolution $\Delta R$ is 3.75 centimeters, which is calculated based on half of the pulse duration $\tau$ multiplied by the speed of light ($c=3\times10^8$ m/s). As shown in Equation 3, the range resolution $\Delta R$ for a sensing system is inversely proportional to the bandwidth ($BW=4\times10^9$ Hz) of the signal 410, such that the range resolution $\Delta R$ can be calculated as the speed of light divided by twice the bandwidth. The Doppler Resolution is a function of the length of the radar frame ($T_{frame}$) because the radar 400 transmits consecutive pulses in signal 410 in order to distinguish objects that are moving. The Doppler Resolution is 2.54 cm/s and can be calculated based on the wavelength divided by twice the length of the radar frame (i.e., Doppler Resolution=$\lambda$/$2T_{frame}$). Accordingly, when a radar operates at a carrier frequency in the terahertz range or sub-terahertz range, then the radar enables fine range resolution and fine Doppler Resolution.

$$\Delta R = c \times \frac{\tau}{2} = \frac{c}{2BW} \quad (3)$$

Although FIG. 4 illustrates one example a radar 400, various changes can be made to FIG. 4. For example, various components in FIG. 4 can be combined, further subdivided, or omitted and additional components can be added according to particular needs. As a particular example, the radar 400 can be a monostatic radar that includes the architecture of the joint communication and sensing (JCAS) system 500 of FIG. 5 described further below.

Figure 5:
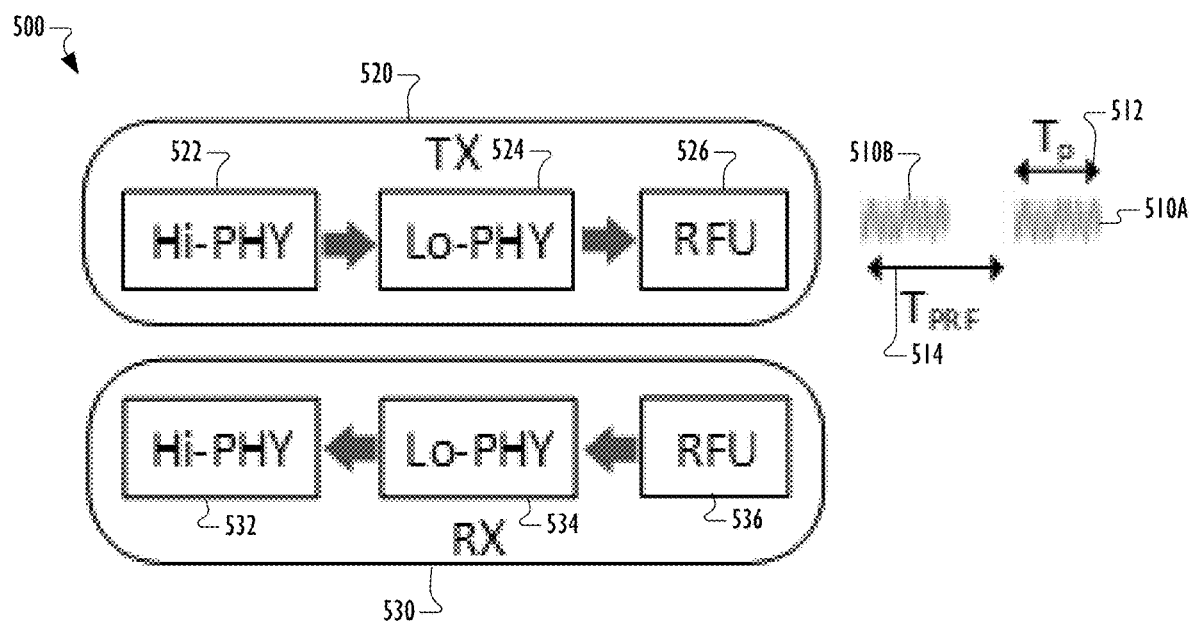
FIG. 5 illustrates joint communication and sensing (JCAS) system according to embodiments of this disclosure.

FIG. 5 illustrates joint communication and sensing (JCAS) system 500 according to embodiments of this disclosure. The embodiment of the JCAS system 500 shown in FIG. 5 is for illustration only, and other embodiments could be used without departing from the scope of this disclosure.

The JCAS system 500 transmits a one or more signals 510a-510b into the physical environment around the JCAS system 500. The signals 510a-510b are similar to the signal 410 of FIG. 4. Particularly, the JCAS system 500 transmits the first signal 510a as a first CEF and after the pulse repetition interval 514 (illustrated as $T_{PRF}$), next transmits the second signal 510b as a second CEF. Each of the signals 510a-510b is characterized by a pulse width 512 (illustrated as $T_p$). The JCAS system 500 includes a transmitter 520, which includes a Hi-PHY 522, a Lo-PHY 524, and a radio frequency unit (RFU) 526. The JCAS system 500 includes a receiver 530, which includes a Hi-PHY 532, a Lo-PHY 534, and an RFU 536. The Hi-PHY 522, 532 performs bit-level signal processing, including encoding and scrambling. The Lo-PHY 524, 534 performs signal-level signal processing, including modulation and filtering. Within the transmitter 520, the RFU 526 of transmits the signals 510a-510b via a transmit antenna. The components within the receiver 530 operate in a reverse order compared to the components within the transmitter. Within the receiver 530, the RFU 536 receives an RF signal via a receive antenna; the Lo-PHY 534 converts a received signal (i.e., delayed echo) from analog format to mixed signal format; and the Hi-PHY converts from mixed signal format to digital signal. After the receiver 530 receives the delayed echo signals based on the first and second signals 510a and 510b, respectively, the JCAS system 500 determines a respective complex CIR based on the respective first and second CEFs, respectively. The delayed echo signals are received from a target object upon which the signals 510a-510b impinged, and are analyzed by the JCAS system 500 to identify the target object and to estimate various features of the identified target, such as range, velocity, and AoA features, based on the frame structure of the transmitted CEFs.

As described above, the JCAS system 500 of FIG. 5 is coupled to transmit antennas and receive antennas, which can be an antenna array of a TTD system as described further below at FIG. 11. The signals 510a-510b are among components within a radar sensing frame, which is described further below at FIGS. 6-10, and which is transmitted by the JCAS system 500 coupled to the TTD system of FIG. 11.

Figure 6:
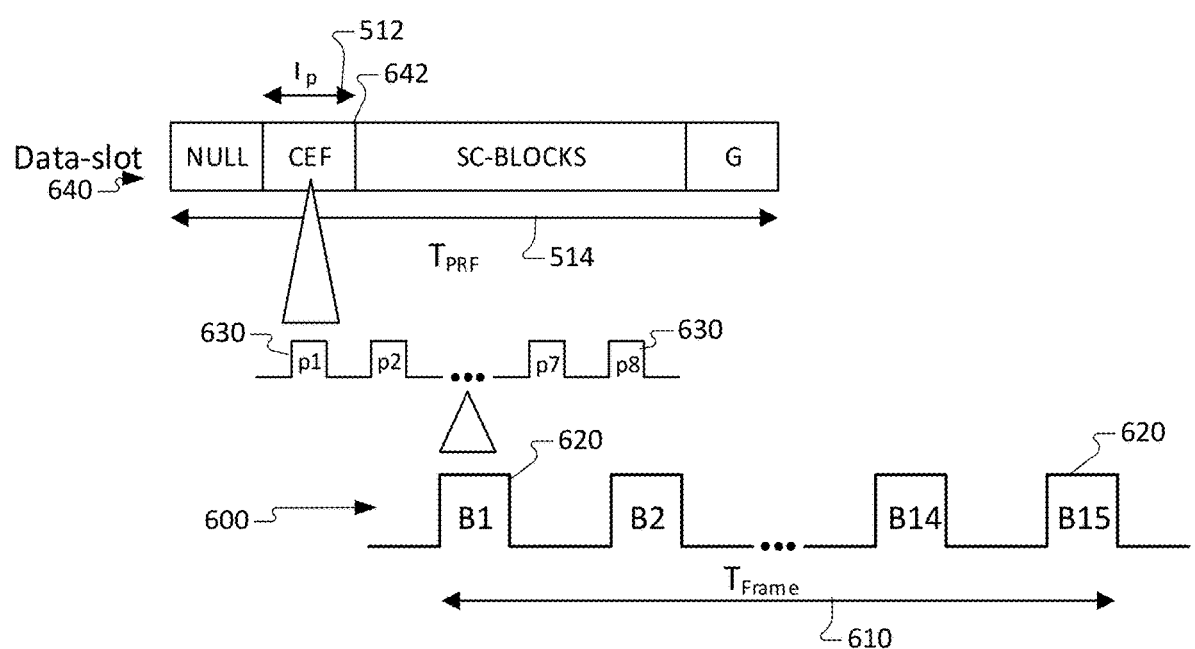
FIG. 6 illustrates a radar sensing frame and a data slot according to embodiments of this disclosure.

FIG. 6 illustrates a radar sensing frame 600 and a data slot 640 according to embodiments of this disclosure. For simplicity, the radar sensing frame 600 can be referred to as the radar frame 600. The embodiment of the radar frame 600 shown in FIG. 6 is for illustration only, and other embodiments could be used without departing from the scope of this disclosure.

The duration 610 of the radar frame 600 is illustrated as $T_{frame}$. The radar frame 600 includes a number of bursts 620, for example, the set of bursts {B1, B2, . . . , B14, B15}. Each burst 620 includes a number of pulses 630, for example, the set of 8 pulses {p1, p2, . . . , p7, pQ}. The number of pulses 630 per burst 620 can be denoted as $N_{pulse}$ or as Q. Every pulse 630 is a CEF.

The unit of transaction between the transmitter 520 and receiver 530 of FIG. 5 is referred to as a data slot 640. Every data slot 640 includes a CEF 642 in addition to the data that is actually transmitted. That is, the data slot includes a NULL portion, the CEF 642, SC-blocks, and a G portion. The transmitter 520 transmits multiple data slots 640 at a fixed period. For example, each data slot 640 has a duration (e.g., 200 microseconds), which can be the same as the pulse repetition interval 514. The CEF 642 is characterized by the pulse width 512 of the signal 510 transmitted from the JCAS system 500.

In a scenario in which the radar frame 600 has a format defined according to an IEEE 802.11 standard, Table 1 provides the system parameters for operating the JCAS system 500. In this scenario, the CEF 642 used to estimate the communication parameters includes a set of Golay sequences. The pulse width 512 can have a length of 1280 symbols.

TABLE 1

Anatomy of a Radar Frame using 802. 11 format

| Frame Specification | Term | Value |
|---|---|---|
| Number of Pulses | $N_{pulse}$ | 8 |
| Number of Bursts | $N_{burst}$ | 15 |
| Pulse Repetition Interval | $T_{PRF}$ | 200 μsec |
| Burst Repetition Interval | $T_{BRF}$ | 3 ms |
| Pulse Width | $T_p$ | 651 ns |
| ADC Sampling Frequency | $F_s$ | 2*1.96608 GHz |

Figure 7:
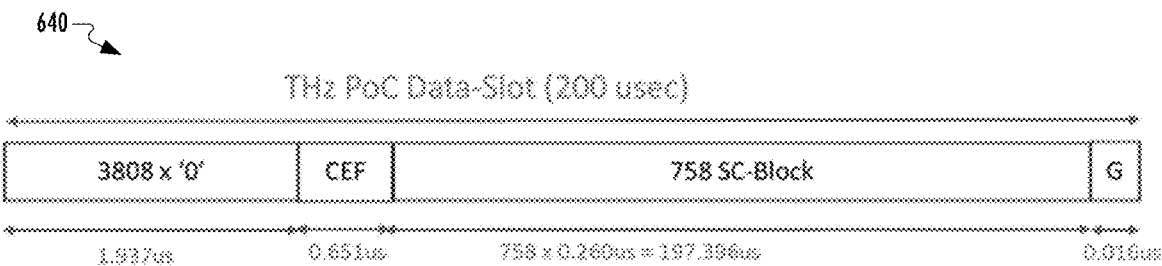
FIG. 7 illustrates additional details of the data slot of FIG. 6.
Figure 8:
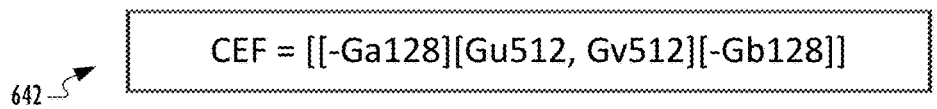
FIG. 8 illustrates additional details of the Channel Estimation Field (CEF) of FIG. 6.
Figure 9:
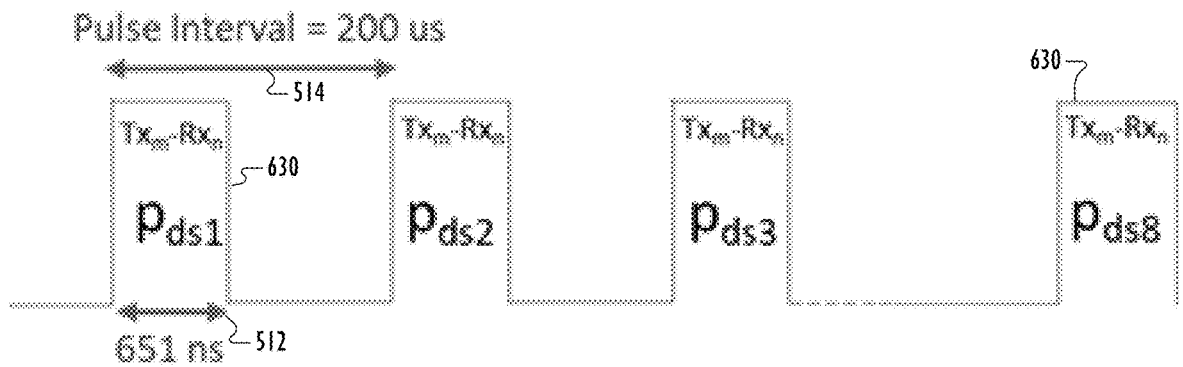
FIG. 9 illustrates additional details of the radar frame of FIG. 6.
Figure 10:
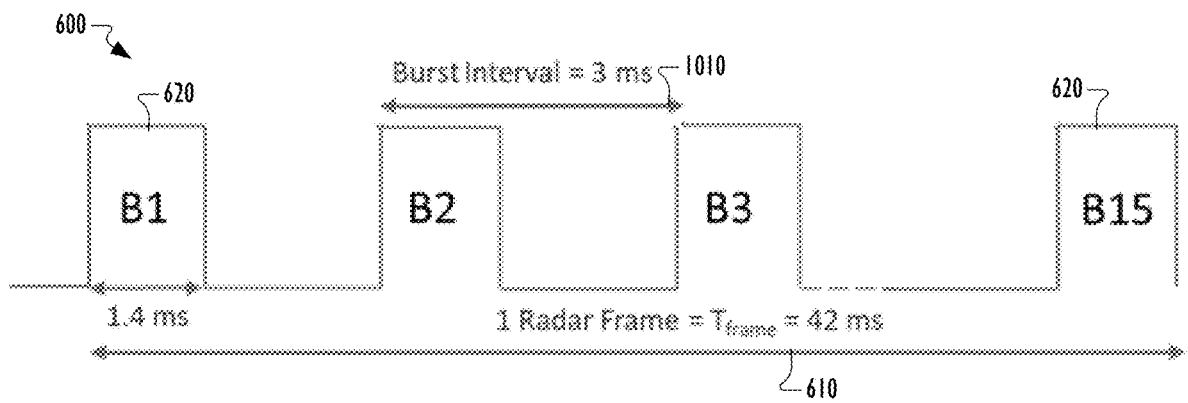
FIG. 10 illustrates additional details of the set of bursts of FIG. 6.

Although FIG. 6 illustrates one example a radar frame 600 and data slot 640, various changes can be made to FIG. 6. For example, various components in FIG. 6 can be combined, further subdivided, or omitted and additional components can be added according to particular needs. As a particular example, FIG. 7 illustrates additional details of the data slot 640; and FIG. 8 illustrates additional details of the CEF 642, including Golay sequences [[−Ga128][Gu512, Gv512][−Gb128]]. As another example, FIG. 9 illustrates additional details of the radar frame 600, including the set of 8 pulses 630, which includes the pulse interval 514 of 200 microseconds and pulse width of 651 nanoseconds. As another example, FIG. 10 illustrates additional details of the set of bursts 620, including the frame duration 610 (e.g., $T_{frame}$=42 ms) and the burst repetition interval 1010 (e.g., $T_{BRF}$=3 ms).

Figure 12A:
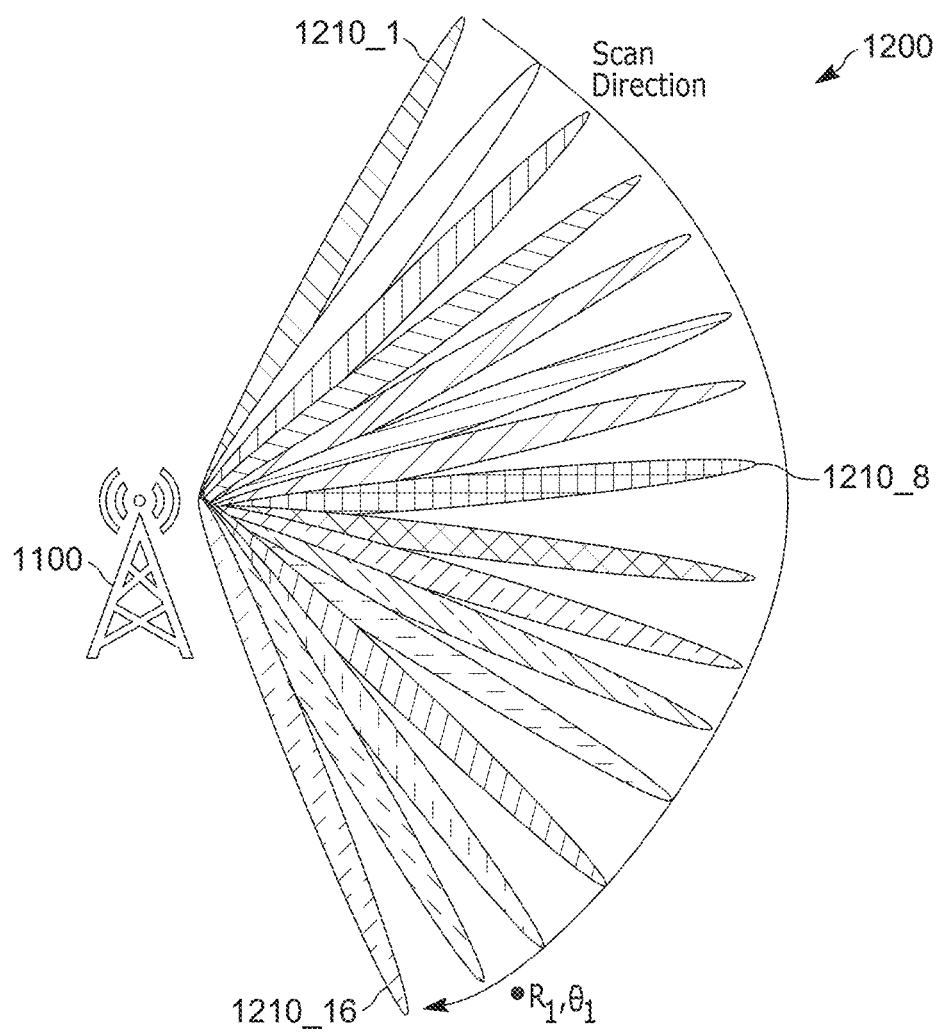
FIG. 12A illustrates a set SFD beams transmitted by the TTD system of FIG. 11.

FIGS. 7-10, which illustrate additional details the radar frame 600, will be described together, and can be used in conjunction with the rainbow beam 1200 of FIG. 12A. The radar frame 600 shown in FIG. 9 is transmitted in 16 directions during one scan of the FoV of 180° of the TTD system 1100 of FIG. 12A. Consider a single target located at $R_1$, $\theta_1$ as shown in FIG. 12A. Each SFDB beam 1210 thus, roughly covers 14° of spatial area. The pulse width $T_p$ of the CEF is 651 ns and the pulse repetition interval $T_{PRF}$ is 200 μs. A collection of these pulses is called a burst and the burst repetition interval is 3 ms. A radar frame duration 610 of duration 42 ms would include 15 such bursts and have a burst repetition interval $T_{BRF}$ of 3 ms. Using TDM radar sensing, some base stations may have to scan all 16 directions sequentially, thus needing 0.672 seconds to cover one scan of the entire FoV and detect the target. However, the technical solution provided by the TTD system 1100 in this disclosure, in the first step of a hybrid sensing procedure, all SDF beams within the rainbow beam 1200 will be activated in parallel, which will require only 42 ms for a coarse scan of the entire FoV. Once the general direction of the target is identified, a fine-grained scan in that direction will take another 42 ms according to the second step of the hybrid sensing procedure, thus a total of 84 ms will be needed to detect the target at a high range resolution.

Figure 11A:
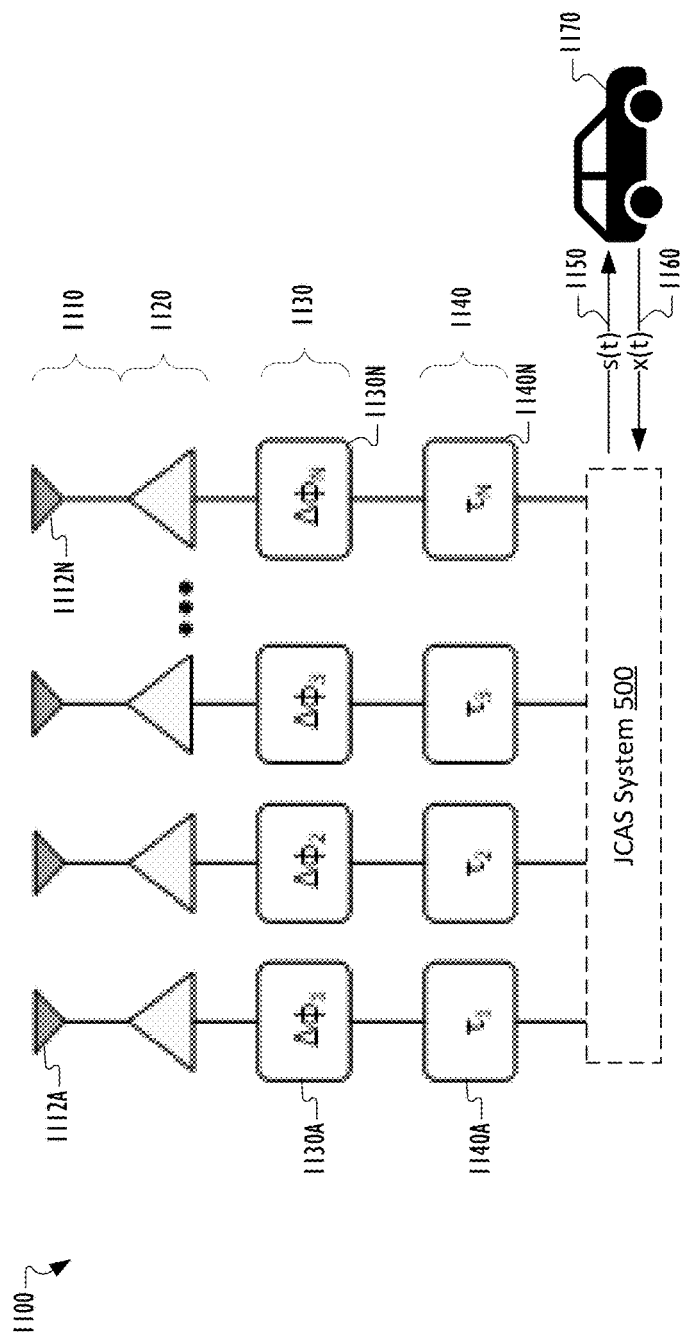
FIG. 11A illustrates a True Time Delay (TTD) system that includes TTD elements and executes SFD beamforming according to embodiments of this disclosure.
Figure 11C:
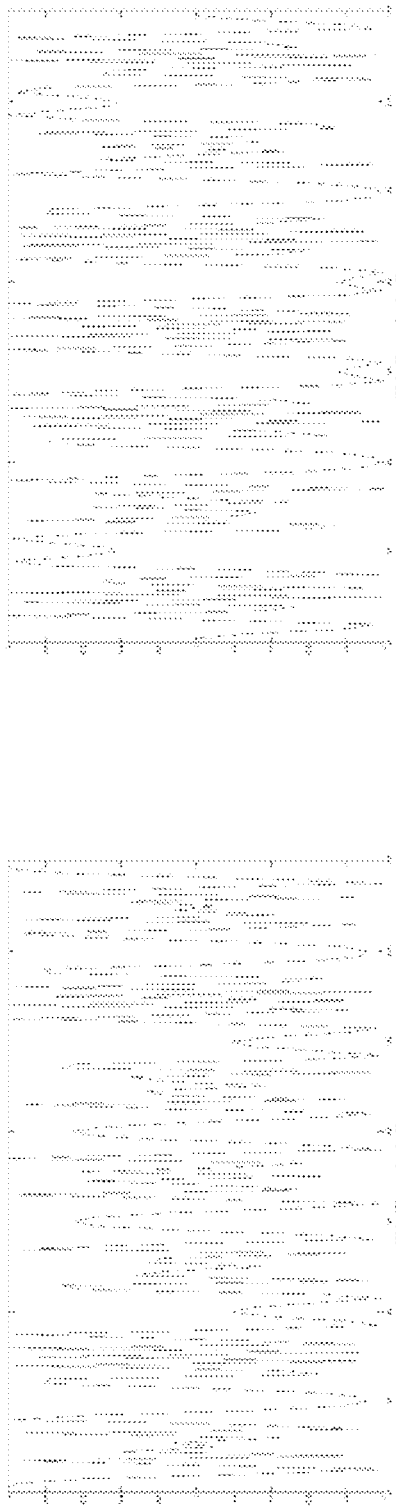
FIGS. 11B and 11C illustrate real components and imaginary components of the $7^{th}$ root of a Zadoff-Chu (ZC) sequence of length 139, respectively, according to embodiments of this disclosure.
Figure 11B:
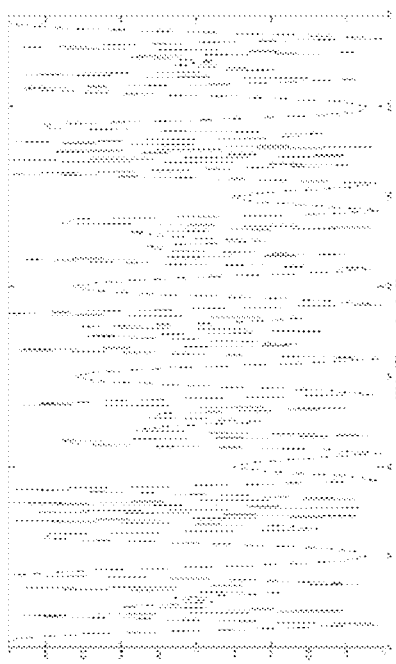
Figure 12B:
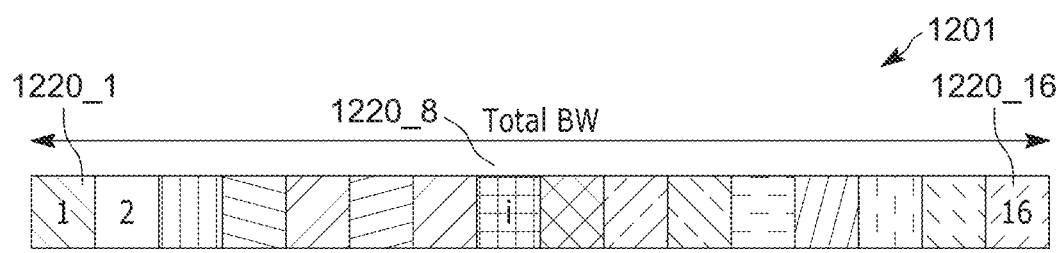
FIG. 12B illustrates the total system bandwidth divided into sub-bands allocated to the set of SFD beams 1200 of FIG. 12A, in accordance with embodiments of this disclosure.
Figure 12C:
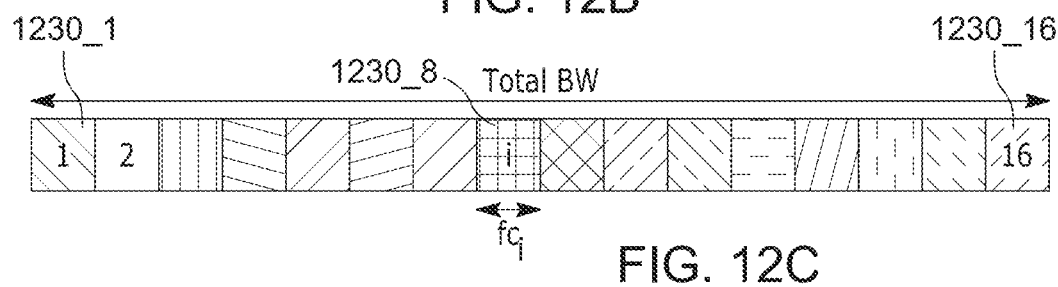
FIG. 12C illustrates the total system bandwidth divided into sub-carriers allocated to the set of SFD beams 1200 of FIG. 12A, in accordance with embodiments of this disclosure.

FIGS. 11 and 12A-12C are described together. FIG. 11 illustrates a True Time Delay (TTD) system 1100 that includes TTD elements and executes SFD beamforming according to embodiments of this disclosure. The embodiment of the TTD system 1100 shown in FIG. 11 is for illustration only, and other embodiments could be used without departing from the scope of this disclosure. FIG. 12A illustrates a set SFD beams 1200 transmitted by the TTD system 1100 of FIG. 11. Collectively, the set of SFD beams 1200 form a rainbow beam that spans a total system bandwidth 1201 of the antenna array 1110 of the TTD system 1100. The set of SFD beams 1200 composed from individual SFD beams 1210 is analogously referred to a rainbow beam 1200 composed from individual sub-beams 1210. Each of FIGS. 12B and 12C illustrates the total system bandwidth 1201 divided into sub-bands and sub-carriers respectively allocated to the set of SFD beams 1200 of FIG. 12A in accordance with embodiments of this disclosure. In FIG. 12B, the total system bandwidth 1201 is divided into 16 sub-bands (illustrated as $BW_i$ for i=1 . . . 16), with each sub-band allocated to a respective SFD beam 1210 among the set of SFD beams 1200. In certain embodiments, the 16 sub-bands allocated to the set of SFD beams 1200 include equivalent bandwidths as each other. In FIG. 12C, the total system bandwidth 1201 is divided into 16 different subcarrier frequencies (illustrated as $fc_i$ for i1 . . . 16), with each subcarrier frequency allocated to a respective SFD beam 1210 among the set of SFD beams 1200. In a particular case of i=8, the $8^{th}$ SFD beam 1210_8 is allocated to the $8^{th}$ sub-band 1220_8 (which has a bandwidth $BW_i$) and to the $8^{th}$ subcarrier frequency 1230_8 (which has a frequency $fc_i$). An analogous description applies the other trios, such as the first SFD beam 1210_1, first sub-band 1220_1, and first subcarrier 1230_1. The embodiment of the set SFD beams 1200 and corresponding total system bandwidth 1201 allocation shown in FIGS. 12A and 12B are for illustration only, and other embodiments could be used without departing from the scope of this disclosure.

Referring specifically to FIG. 11, the TTD system 1100 includes an antenna array 1110, power amplifiers 1120, phase shifters 1130, and TTD elements 1140 for beamforming according to embodiments of this disclosure. The TTD elements 1140 are hardware components that enable the antenna array 1110 to simultaneously transmit SFD beams. This disclosure describes the antenna array 1110 as being a mmWave antenna array, but this disclosure is not limited to only mmWave antenna arrays. The antenna array 1110 can be a Joint Phased Time Array (JPTA). To perform radar functions, such as range estimation, the TTD system 1100 is operably coupled to the JCAS system 500 of FIG. 5. For ease of explanation, the TTD system 1100 will be described as including the JCAS system 500. The TTD system 1100 can be components of the gNB 102 of FIG. 2, such as the antennas 205a-205n coupled to the transceivers 210a-210n.

The Federal Communications Commission (FCC) opened up the spectrum between 95 GHz and 3 THz in 2019 for furthering advances in data-intensive, high-bandwidth user applications such as communication, imaging and sensing. In order to meet the stringent requirements of ultra-low latency and high-throughput needs of next generation (6G) communication standards, the THz frequencies appear to be the most promising. At such high frequencies, the challenges related to path loss, array size and effective beamforming discussed earlier only get further exacerbated. In addition, approximating time-delay with phase shifters is adequate in narrow-band systems, but for wide-band systems this could lead to beam squinting.

In the context of real-time sensing, identifying directional strength of the beam becomes even more imperative, and angle of arrival (AoA) and angle of departure (AoD) of the beam is calculated during a process called as beam training. Replacing/augmenting phase-shifters with true-time delay (TTD) elements has been demonstrated to significantly reduce the power budget needed for beamforming while achieving delay resolutions of the range of a few picoseconds. In the TTD system 1100, each TTD element is coupled with a phase shifter for each antenna element 1112 in the antenna array 1110. Each antenna element can have an index i that also indexes the corresponding phase shifter and TTD element. For example, a first antenna element 1112a is coupled to a first TTD element 1140a (illustrated as $\tau_1$) and a first phase shifter (illustrated as $\Delta\Phi_1$). Similarly, for the index i=N, the Nth antenna element 1112*n* is coupled to the Nth TTD element 1140*n* (illustrated as $\tau_N$) and the Nth phase shifter (illustrated as $\Delta\Phi_N$). The frequency dependent beamforming weights are given by Equation 4. This disclosure identifies unique features of a real-time THz sensing application that is enabled with a set of TTD elements 1140*a*-1140*n*.

$$w(f)=[e^{j2\pi f \tau_1+\Delta\varphi_1}, e^{j2\pi f \tau_2 \Delta\varphi_2}, e^{j2\pi f \tau_3+\Delta\varphi_3}, \ldots \\ e^{j2\pi f \tau_N+\Delta\varphi_N}]^T \quad (4)$$

The TTD system 1100 is different from other phase-shifter based systems. In other phase-shifter based systems, the full system bandwidth can be accessed to achieve the best range resolution. However, in the TTD based system, the range resolution gets degraded, for example, degradation by the 3 dB bandwidth in each angular direction. As a particular example, the JCAS system 500 can use a carrier frequency of 140 GHz with a system bandwidth of 4 GHz, and can have the range resolution is 3.75 cm. However, to integrate TTD techniques with 16 sub-bands, each sub-band having a 3 dB bandwidth of 250 MHz as shown in FIG. 12, the range resolution would degrade to 60 cm. A range resolution of 60 cm can be a problem if finer granularity is desired.

Embodiments of this disclosure provide a solution to the problem of degradation of the range resolution, namely, the solution includes a two layered sensing policy. In the first layer of sensing ("Layer 1"), TDD elements 1140 are configured to generate the set of SFD beams 1200 to quickly scan the environment, albeit at a coarse granularity, to identify potential targets. Once spatial clusters are identified as the potential targets, switching from the first layer to the second layer of sensing ("Layer 2") is performed. In the second layer of sensing, TDM beam switching is performed using phase shifters 1130 at a TDM bandwidth (e.g., maximum bandwidth), but a subset of SFD beams is targeted only at the spatial clusters that were previously identified.

In certain embodiments, Layer 1 of the TTD system 1100 uses a set of Zadoff-Chu (ZC) sequences that is unique for each sub-band, while Layer 2 of the TTD system 1100 uses a set of Golay sequences similar to that of the 802.11 communication standard. Alternatively, in another embodiment, in Layer 2, a longer ZC sequence, which spans the full bandwidth, can be used.

From the JCAS system 500, the transmitted signal s(t) 1150 for each sub-band is expressed by Equation 5, where $\Pi(T_p)$ represents a rectangular pulse of duration $T_p$ modulated with a carrier frequency $f_c$ and transmitted at time T. This rectangular pulse can be repeated P times to form a radar frame (e.g., radar frame 600). Examples of consecutive rectangular pulses include the first signal 510*a* and second signal 510*b* of FIG. 5, or the first and second pulses 630 of FIG. 6 (illustrated as $p_{ds1}$ and $p_{ds2}$). The transmitted signal s(t) 1150 includes pulse-modulated continuous waves (CWs) that include periodic and short power pulses and silent periods. As an example of a single radar frame, the transmitted signal s(t) 1150 includes the $N_{pulse}$=8 pulses 630 per burst 620 of FIG. 9, continuous for the $N_{burst}$=15 bursts per frame.

$$s(t)=\Pi_{T_p}(t-T)\exp(j\pi f_c t) \quad (5)$$

This transmitted signal 1150 propagates through an additive white Gaussian noise (AWGN) channel, gets reflected from potential targets 1170 and is received after a time delay of $\gamma$ at the baseband receiver (after demodulation) as the received signal x(t) 1160, which is expressed by Equation 6. The attenuation factor during propagation is denoted as $\alpha$, and n(t) represents the corresponding noise.

$$x(t)=\alpha s(t-\gamma)+n(t) \quad (6)$$

The sensing sub-system extracts the channel impulse response (CIR) by correlating the received signal 1160 with the CEF to identify and localize targets as expressed by Equation 7.

$$y(\gamma)=\int x(t)s^*(t-\gamma)dt \quad (7)$$

The estimated delay $\hat{\gamma}$ is calculated using Equation 8.

$$\hat{\gamma} = \underset{\gamma}{\mathrm{argmax}}|y(\gamma)| \quad (8)$$

Using the above equations, the range R can be estimated using Equation 9 in both layers independently.

$$R = \frac{c\hat{\gamma}}{2} \quad (9)$$

Now refer temporarily to FIGS. 11B-11C. FIGS. 11B and 11C illustrates real components and imaginary components of the $7^{th}$ root of ZC sequence of length 139, respectively. The $u^{th}$ root of the ZC sequence of length $N_{ZC}$ is given by Equation 10. A ZC sequence is a complex-valued signal that has constant amplitude and zero autocorrelation (CAZAC). When shifted cyclically, they are orthogonal too. The real and imaginary components of the $7^{th}$ root ZC sequence of length can be used in the first sub-beam of Layer 1. For every subsequent sub-beam, a new marker with zero correlation properties can be derived by an appropriate cyclic shift of this $u^{th}$ root.

$$x_u(n) = \exp\left(\frac{-j\pi u n(n+1)}{N_{ZC}}\right) \text{ for } 0 \le n \le N_{ZC}-1 \quad (10)$$

Although FIGS. 11A-12B illustrate one example TTD system 1100 transmitting a set of SFD beams 1200 corresponding to a total bandwidth 1201, various changes can be made to FIGS. 11A-12B. For example, various components in FIGS. 11-12B can be combined, further subdivided, or omitted and additional components can be added according to particular needs. As a particular Layer 1 example, the total bandwidth 1201 of FIG. 12B can be divided into 5 sub-bands, such that FIG. 13 illustrates a rainbow beam that includes a set of five SFD beams 1310_1 through 1310_5 transmitted via the five sub-bands at a time t, as shown in FIG. 13.

Figure 13:
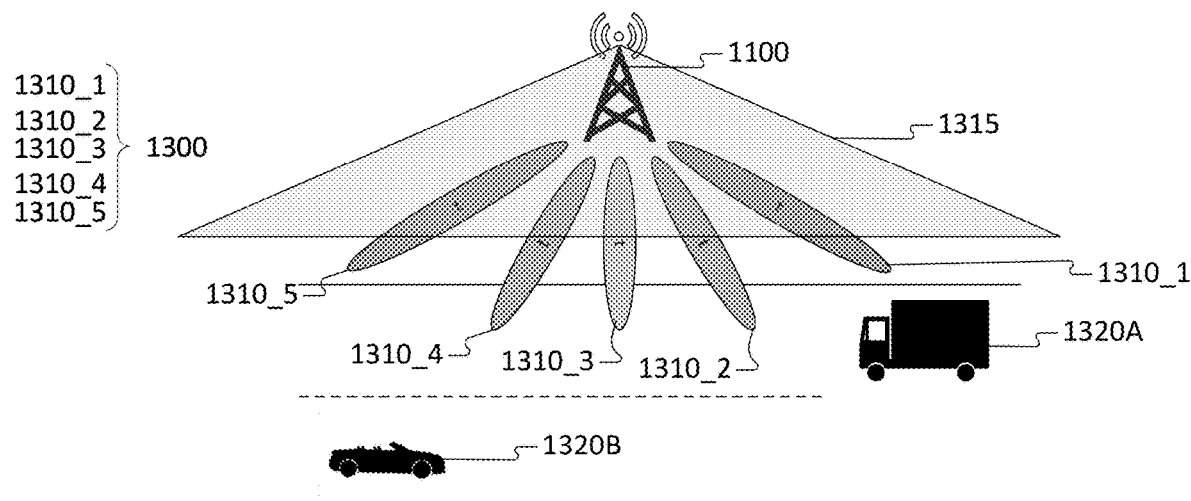
FIG. 13 illustrates a rainbow beam that includes a set of five SFD beams transmitted by the TTD system 1100 of FIG. 11.

FIG. 13 illustrates a rainbow beam 1300 that includes a set of five SFD beams 1310_1 through 1310_5 transmitted by the TTD system 1100 of FIG. 11. The set of five SFD beams 1310_1 through 1310_5 is simultaneously transmitted via the five sub-bands at a time t to scan the entire field of view (FoV) 1315, and each of the SFD beams 1310_1 through 1310_5 is transmitted in a different direction from the others. For ease of explanation, the FoV 1315 is also referred to as the environment of the TTD system 1100, although in reality the environment of the TTD system 1100 surrounds all sides of the TTD system 1100. To perform a radar ranging functions at coarse granularity, the TTD system 1100 detects a first target 1320*a* located in the direction of the first SFD beam 1310_1 and detects a second target 1320b located in the direction of the fourth SFD beam 1310_4.

Figure 14:
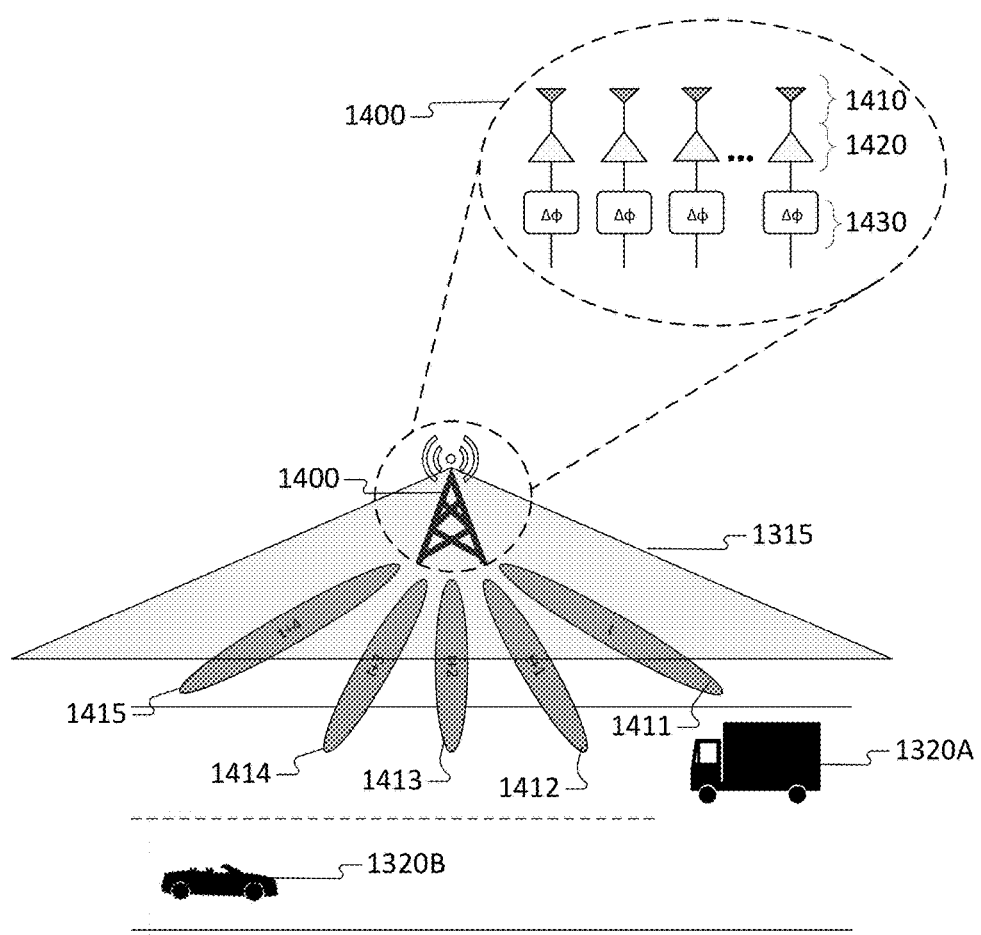
FIG. 14 illustrates a TDM system that scans the environment according to a TDM procedure, in accordance with embodiments of this disclosure.

FIG. 14 illustrates a TDM system 1400 that scans the environment according to a TDM procedure, in accordance with embodiments of this disclosure. The TDM system 1400 has the same FoV 1315 as the TTD system 1100 of FIG. 13. For ease of explanation, an enlarged window shown in FIG. 14 illustrates additional components of the TDM system 1400, including an antenna array 1410, power amplifiers 1420, and phase shifters 1430 for beam sweeping. As a comparison, the TDM system 1400 of FIG. 14 has shortcomings that the TTD system 500 provides technical solutions that overcome. For example, the TDM system 1400 does not include any TTD elements 1140 and consequently cannot generate SFD beams that enable Layer 1 real-time sensing.

The TDM system 1400 can be used in the Layer 2. Particularly, the TDM system 1400 performs beam sweeping using narrow beams according to a TDM procedure. The TDM system 1400 transmits a sequence of five TDM beams 1411-1415 at a same TDM frequency as each other, but at different time slots {t, t+1, t+2, t+3, t+4} from each other, respectively. To scan the entire FoV 1315, each TDM beam 1411-1415 is transmitted in a different direction from every other.

Features of the TDM system 1400 can be incorporated into Layer 2 of the hybrid sensing that embodiments of this disclosure execute. To scan a first portion of the environment where the first target 1320a was initially detected by the first SFD beam 1310_1, the TDM system 1400 performs fine granularity sensing in which the TDM system 1400 transmits the first TDM beam 1411 at the TDM bandwidth in the same direction as (for example, at phase angles that correspond to) the first SFD beam 1310_1 to detect and measure the first target 1320a. Similarly, to scan another portion of the environment where the second target 1320b was initially detected by the fourth SFD beam 1310_4, the TDM system 1400 transmits the fourth TDM beam 1414 at the TDM bandwidth in the same direction of the fourth SFD beam 1310_4 to detect and measure the second target 1320b.

Figure 15:
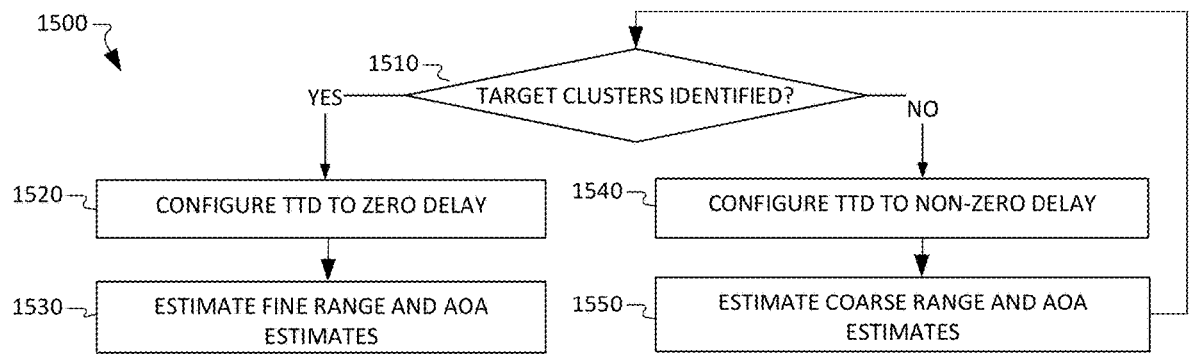
FIG. 15 illustrates a method of hybrid sensing according to embodiments of this disclosure.
Figure 16:
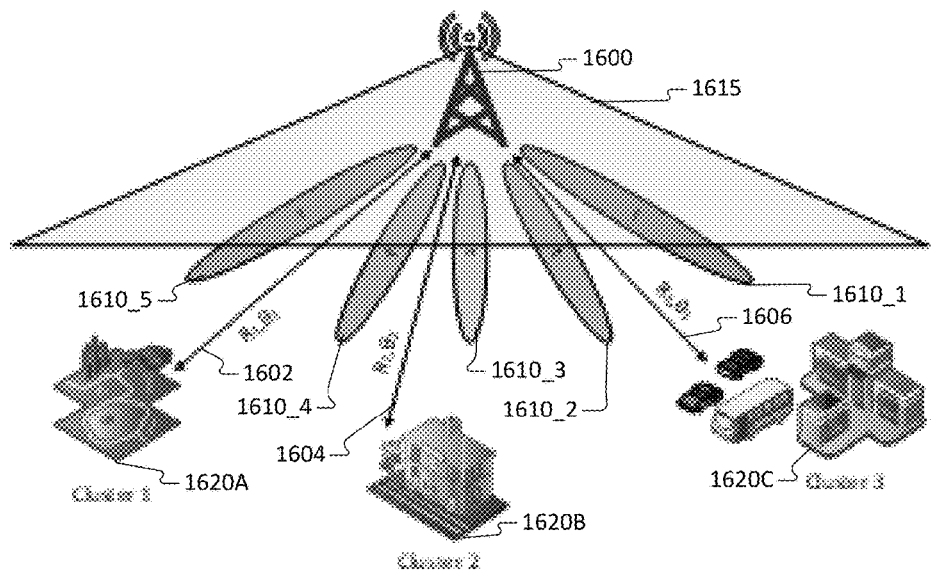
FIG. 16 illustrates an example of Layer 1 coarse grained sensing according to embodiments of this disclosure.
Figure 17:
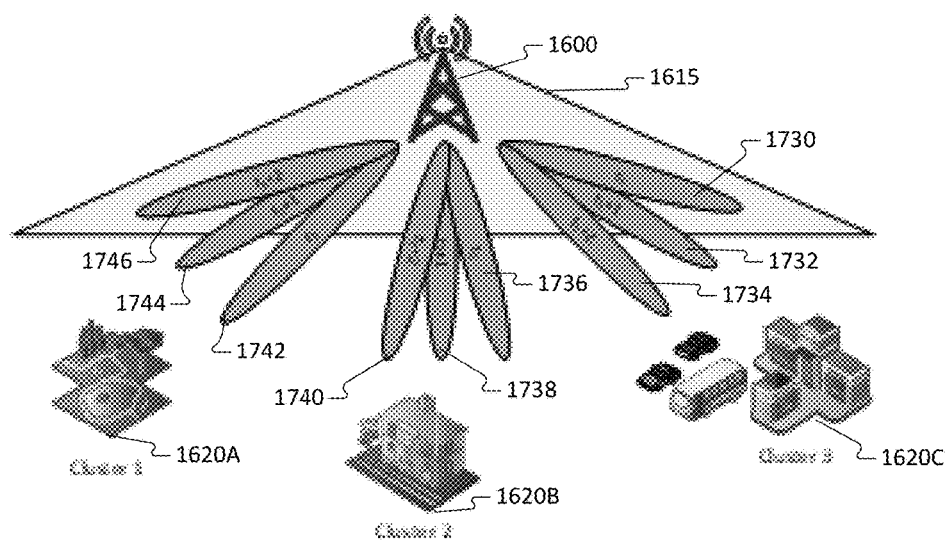
FIG. 17 illustrates an example of Layer 2 fine grained sensing according to embodiments of this disclosure.

FIGS. 15-17 will be described together. FIG. 15 illustrates a method 1500 of hybrid sensing according to embodiments of this disclosure. FIG. 16 illustrates an example of Layer 1 coarse grained sensing according to embodiments of this disclosure. FIG. 17 illustrates an example of Layer 2 fine grained sensing according to embodiments of this disclosure. The embodiments FIGS. 15-17 are for illustration only, and other embodiments could be used without departing from the scope of this disclosure. In FIGS. 15-17, a base station 1600 (e.g., gNB 102 of FIG. 2), which includes the TTD system 1100 of FIG. 11A and the TTD compute system 1900 of FIG. 19, executes the method 1500 to identify targets in the environment within the FoV 1615 of the base station. The FoV 1615 of FIGS. 16-17 can be the same as or similar to the FoV 1315 of FIGS. 13-14.

As shown in FIGS. 16 and 17, the location of the base station 1600 is at a polar distance 1602 of $R_1, \theta_1$ from a first target cluster 1620a, a polar distance 1604 $R_2, \theta_2$ from a second cluster 1620b and a polar distance 1606 $R_3, \theta_3$ from a third target cluster 1620c. To start the method 1500, the base station 1600 configures TTD elements 1140 such that all the sub-beams 1610_1 through 1610_5 used to service (e.g., scan or measure radar range) the environment within the FoV 1615 are activated in parallel (e.g., simultaneously transmitted) at time t.

At block 1510, once coarse estimates of potential targets are received, the base station 1600 determines whether any of the target clusters 1620a-1620c is identified, based on the data received from the set of sub-beams 1610_1 through 1610_5. At block 1520, in response to a determination that one or more of the spatial target clusters 1620a-1620c were identified, the base station 1600 configures the TTD elements 1140 to zero delay.

At block 1530, for each target cluster 1620 identified, the base station 1600 estimates fine range and estimates AoA. For example, if the base station identified all three of the target clusters 1620a-1620c are identified, then after configuring the TTD elements 1140 such that a fine-grained scan can be performed in each of these three target clusters 1620a-1620c at times $t_1$, $t_2$ and $t_3$, respectively using a TDM bandwidth. In certain embodiments, the TDM bandwidth is the full spectrum bandwidth. Additional details of block 1530 are illustrated in FIG. 17.

FIG. 17. shows that the base station 1600 performs a beam switching to scan the portion of the environment where each target cluster 1620 is identified. As described above, the base station 1600 commences a first beam switching procedure by transmitting a first TDM beam 1630 at time $t_1$ at the TDM bandwidth in order to scan the third target cluster 1620c at a fine granularity. To continue scanning the third target cluster 1620c according to the fine granularity of Layer 2, the base station 1600 beam switches by subsequently transmitting a second TDM beam 1632 at time $t_1+1$ using the TDM bandwidth. To complete scanning the third target cluster 1620c according to the fine granularity of Layer 2 the base station 1600 beam switches by subsequently transmitting a third TDM beam 1634 at time $t_1+2$ at the TDM bandwidth. Analogously, in order to scan the second target cluster 1620b at the fine granularity of Layer 2, the base station 1600 performs a second beam switching procedure by transmitting fourth, fifth, and sixth TDM beams 1636, 1638, and 1640 at times $t_2$, $t_2+1$, and $t_2+2$, respectively using the TDM bandwidth. Similarly, in order to scan the first target cluster 1620a at the fine granularity of Layer 2, the base station 1600 performs a third beam switching procedure by transmitting seventh, eighth, and ninth TDM beams 1642, 1644, and 1646 at times $t_3$, $t_3+1$, and $t_3+2$, respectively using the TDM bandwidth.

On the other hand, at block 1540, in response to a determination that none of the spatial target clusters 16201-1820c was identified, the base station 1600 configures the TTD elements 1140 to non-zero delay. At block 1550, the base station 1600 estimates coarse range and estimates AoA in the FoV 1615, and the method 1500 repeats by returning to block 1510. Particularly, the base station 1600 uses the reconfigured TTD elements 1140 such that all the sub-beams 1610_1 through 1610_5 are simultaneously transmitted into the environment within the FoV 1615 at time t.

Figure 18:
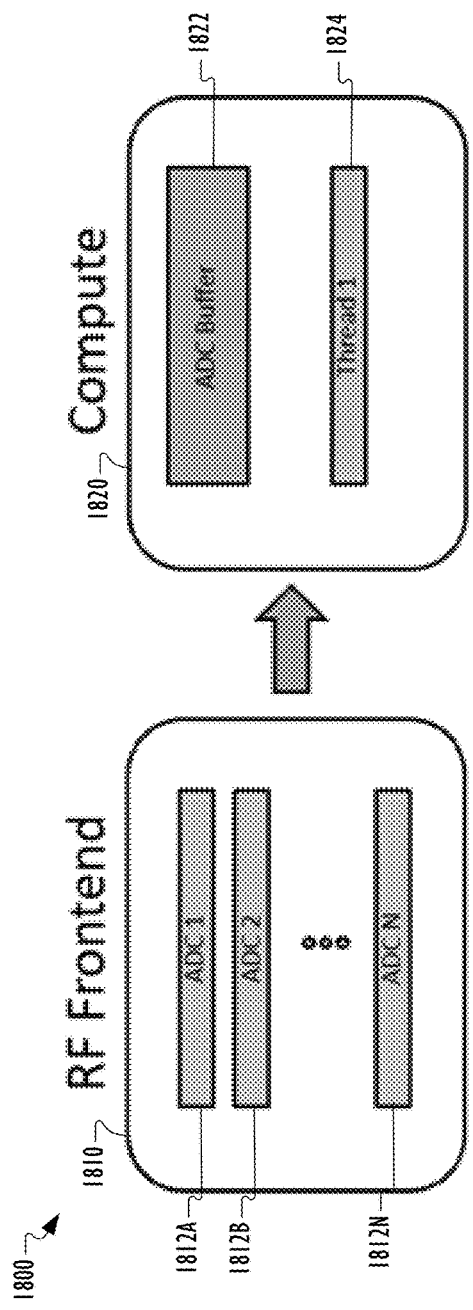
FIG. 18 illustrates a phase-shifter based compute system that includes an RF frontend 1810 and a compute subsystem.

FIG. 18 illustrates a phase-shifter based compute system 1800 that includes an RF frontend 1810 and a compute sub-system 1820. The RF frontend 1810 includes N ADCs 1812a-1812n. The compute sub-system 1820 includes a single thread 1824 that processes data sequentially from each ADC 1812 via an ADC buffer 1822 in a TDM fashion. Accordingly, the phase-shifter based compute system 1800 can be used to process data received from the TDM system 1400 of FIG. 14.

Figure 19:
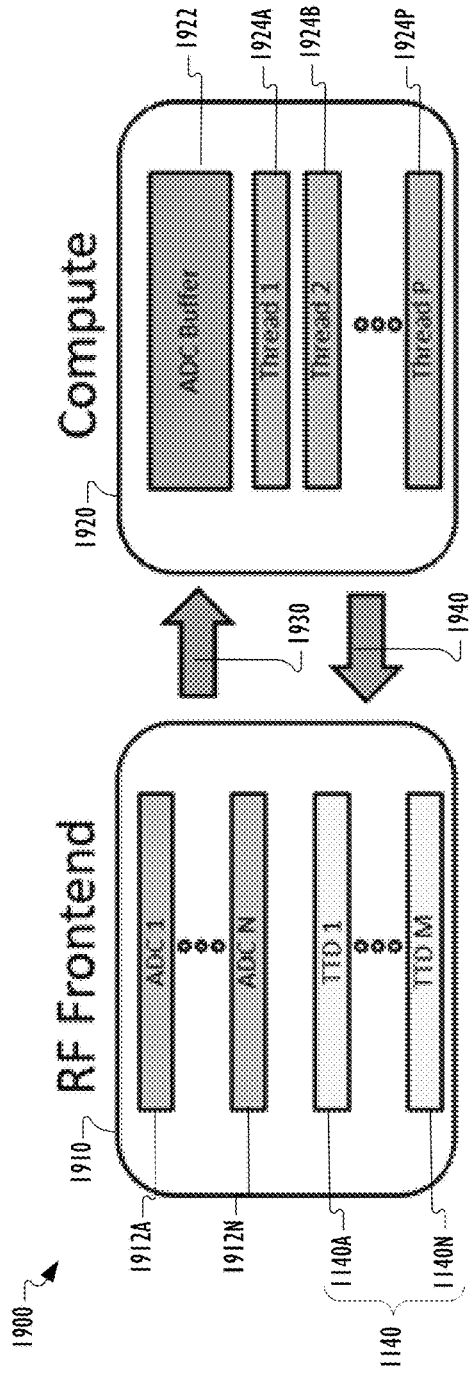
FIG. 19 illustrates a TTD-based compute system in accordance with embodiments of this disclosure.

FIG. 19 illustrates a TTD-based compute system 1900 in accordance with embodiments of this disclosure. The embodiment of the TTD-based compute system 1900 shown in FIG. 19 is for illustration only, and other embodiments could be used without departing from the scope of this disclosure.

The TTD-based compute system 1900 includes an RF frontend 1910 and a compute sub-system 1920. The RF frontend 1910 includes multiple ADCs 1912a-1912n (illustrated as ADC 1 through N) and a set of TTD elements 1140. Within the RF Frontend 1910, the last TTD element 1140N is labeled as "TTD M" to illustrate that number (M) of TTD elements within the set of TTD elements 1140 can be the equal to or different from the number of ADCs 1912. The compute sub-system 1920 includes an ADC buffer 1922 and multiple threads 1924s-1924p that concurrently process data received from different sub-beams. The last thread 1924p is labeled as "Thread P" to that number (P) of threads can be equal to or different from the number (N) of ADCs or the number (M) of TTDs. A processor, such as the processor 225 of the gNB 102, writes data 1930 from the ADCs 1912a-1912n to the ADC buffer 1922.

As a comparison, the TTD-based compute system 1900 as shown in FIG. 19 provides technical solutions that overcome shortcoming of the phase-shifter based compute system 1800 of FIG. 18. Particularly, the TTD-based compute system 1900 includes multiple threads that concurrently process the data being received in real time from different sub-beams.

In the case of parallel activation of multiple sub-bands, the TTD system 1100 generates a very high volume of data that needs to be processed. In order for embodiments of this disclosure to achieve real-time sensing at a rate of 20 Hz-30 Hz, the TTD-based compute system 1900 processes this real-time sensing data at a very high throughput. Because different sub-bands 1220 are operating at different frequencies, every corresponding radar frame in a sub-band 1220 has a different wavelength. For example, as shown in FIGS. 12A-12C, if the first sub-band 1220_1 is operating at 140 GHz (i.e., first subcarrier frequency 1230_1 of $fc_1$), then its wavelength is $\lambda_1$=2.14 mm, and if 16 sub-beams 1200 (of FIG. 12A) are used for a system total bandwidth 1201 of 4 GHz, then the last sub-band 1220_16 has a wavelength $\lambda_{16}$=2.08 mm. This wavelength difference between $\lambda_1$ and $\lambda_{16}$ will impact the target's 1320a-1320b features estimated in each sub-band 1220. To compensate for these wavelength shifts when combining the results from the different sub-bands 1220, once the data from the different sub-bands 1220 has been processed and analyzed, the data 1940 is fed-back to reconfigure the TTD elements 1140.

Figure 20:
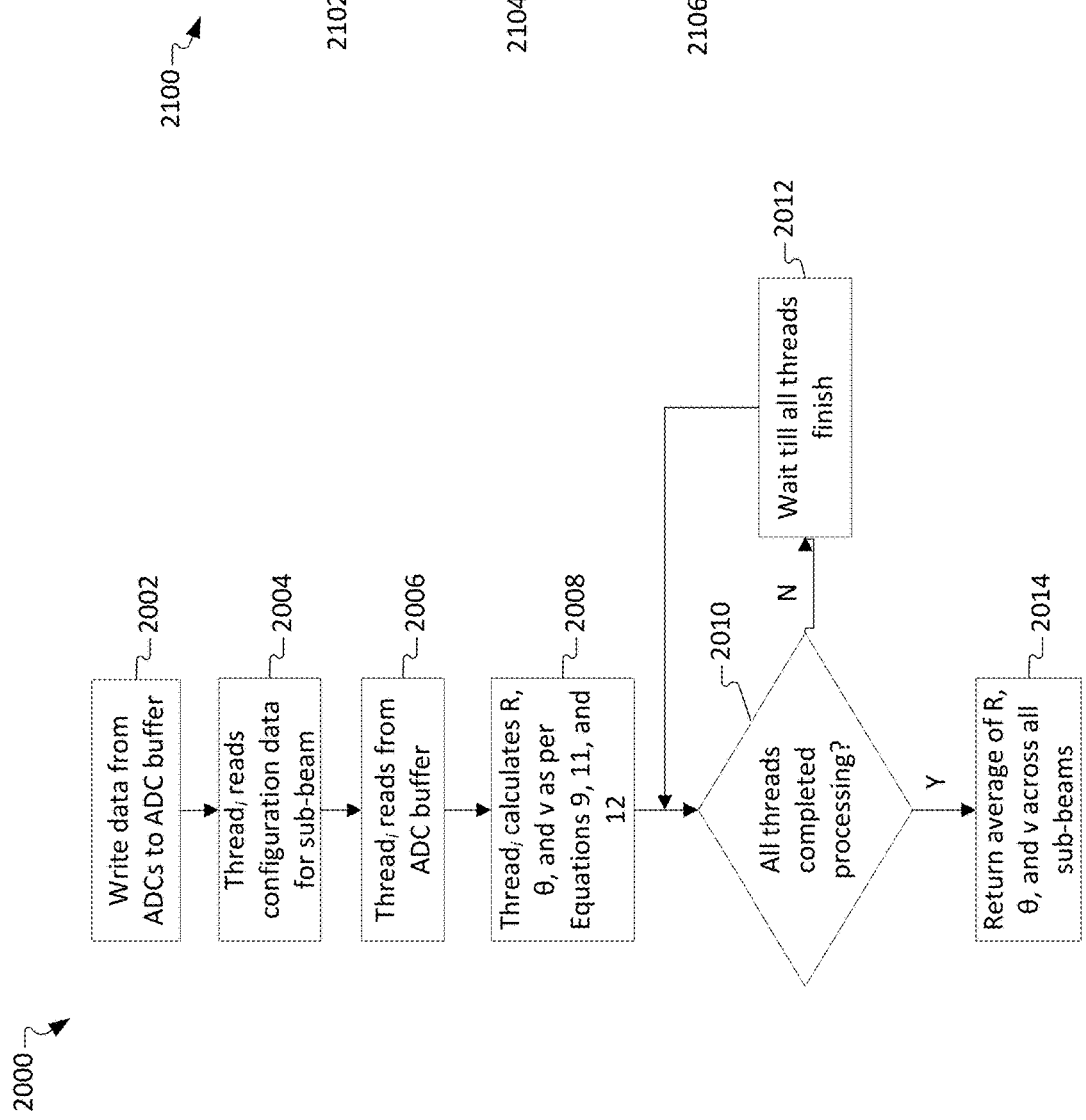
FIG. 20 illustrates a method of thread processing according to embodiments of the present disclosure.

FIG. 20 illustrates a method 2000 of thread processing according to embodiments of the present disclosure. The embodiment of the method 2000 shown in FIG. 20 is for illustration only, and other embodiments could be used without departing from the scope of this disclosure. The method 2000 can be executed by a processor (such as the processor 225 of the gNB 102 of FIG. 2 or the processor 340 of the UE 116 of FIG. 3) that controls the TTD compute system 1900 of FIG. 19. FIG. 20 includes the steps involved in combining data from a set of SFD beams 1200 to estimate range, velocity and AoA of the targets.

At block 2002, data 1930 from the ADCs 1912a-1912n is written to the ADC buffer 1922. At block 2004, the threads 1924a-1924p read configuration data for the sub-beams (e.g., sub-beams 1210_1 through 1210_16). In certain embodiments, each individual thread, (e.g., indexed by i for 1 to p; such as Thread 1 1924a) among the P threads 1924a-1924p can correspond to a respective one sub-beam (e.g., first SFD beam 1210_1) from a rainbow beam 1200. Particularly, the thread, reads configuration data for a corresponding sub-beam.

At block 2006, each of the threads 1924a-1924p read from the ADC buffer 1922. Particularly, each individual thread, (e.g., Thread 1 1924a) reads data (such as data 1930) for a corresponding sub-beam (e.g., first SFD beam 1210_1) that was previously written into the ADC buffer 1922.

At block 2008, each individual thread, calculates a range R, angle of arrival θ, and velocity v according to Equations 9, Equation 11, and Equation 12. At block 2010, the processor 225 determines whether all threads 1924a-1924p completed processing (e.g., calculations of block 2008). At block 2012, in response to a determination that all threads have not completed processing, the processor 225 waits till all threads complete processing, and the method 2000 repeats block 2010. At block 2014, in response to a determination that all threads completed processing, an average of range R, angle of arrival θ, and velocity v across all sub-beams is returned (e.g., calculated and output from the TTD compute system 1900). In one embodiment, the average range, velocity and AoA across all sub-bands is calculated and returned. In another embodiment, the most recent range, velocity and AoA across all sub-bands is calculated and returned.

Figure 21:
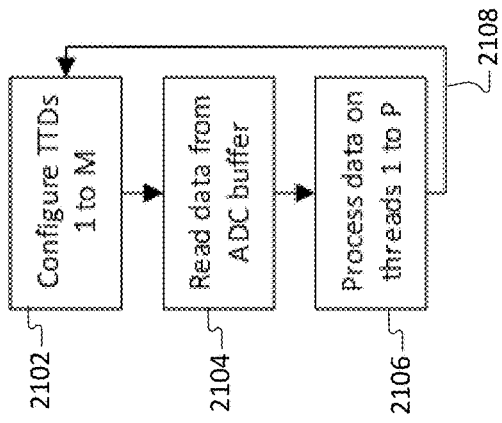
FIG. 21 illustrates a closed-loop feedback involved in a method of configuring the TTD elements, according to embodiments of the present disclosure.

FIG. 21 illustrates a closed-loop feedback involved in a method 2100 of configuring the TTD elements 1140, according to embodiments of the present disclosure. The method 2100 can be executed by a processor (such as the processor 225 of the gNB 102 of FIG. 2 or the processor 340 of the UE 116 of FIG. 3) that controls the TTD compute system 1900 of FIG. 19. At block 2102, processor 225 configures the set of TTD elements 1140 (illustrated as TTD 1 through TTD M) with TTD settings. At block 2104, the processor 225 reads data from the ADC buffer 1922. The procedure at block 2104 can be the same as or similar to the procedure of block 2006 of FIG. 20. At block 2106, the processor 225 concurrently processes data on the set of threads 1924a-1920p (illustrated as Thread 1 through Thread P). The arrow 2108 represents that the method 2100 returns to block 2102 as a closed-loop feedback. Also, the arrow 2108 represents that feedback of data 1940 of FIG. 19 that is used to reconfigure (e.g., update settings of) the set of TTD elements 1140.

Figure 22:
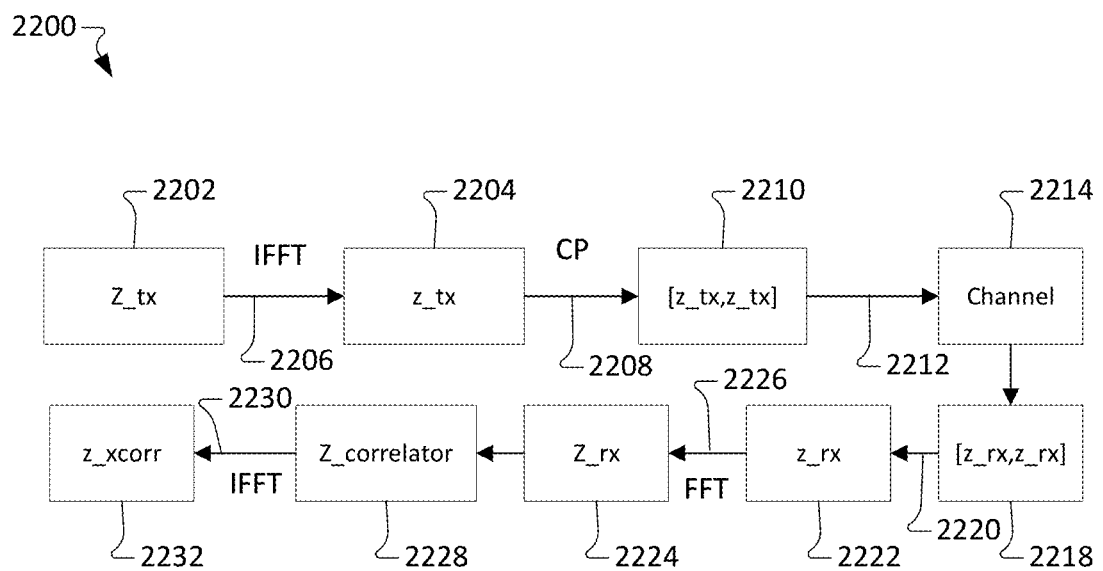
FIG. 22 illustrates a block diagram of a simulation pipeline estimating the range for a single channel with no TTD, according to embodiments of this disclosure.

FIG. 22 illustrates a block diagram of a simulation pipeline 2200 estimating the range for a single channel with no TTD, according to embodiments of this disclosure. The embodiment of the TTD simulation pipeline 2200 shown in FIG. 22 is for illustration only, and other embodiments could be used without departing from the scope of this disclosure. The simulation pipeline 2200 can be a component of the TTD compute system 1900 of FIG. 19. For example, the TTD compute system 1900 can include multiple simulation pipelines 2200, such as an individual simulation pipeline 2200 per sub-beam (e.g., per ADC 1912a-1912N of FIG. 19).

When all the sub-beams (for example, rainbow beam 1200 or 1300 of FIG. 12 or 13, or beams 1610_1 through 1610_5 of FIG. 16) are activated in parallel, there is huge deluge of data that needs to be processed in real-time (20 Hz-30 Hz). For example, in the case of N sub-bands, TTD compute system 1900 executes N correlations in parallel to estimate the range R, direction θ, and velocity v.

The simulation pipeline 2200 enables embodiments of the present disclosure to sub-sample the input signal before running the parallel correlations. This is due to the fact that every sub-band is operating on a 3 dB bandwidth reduced by a factor of N. To reduce the data-rate, simulation pipeline 2200 can sub-sample the data while still meeting Nyquist rate and not causing aliasing.

According to embodiments of this disclosure, every sub-band is operating at a slightly different carrier frequency. The velocity v of any moving target (such as a truck target 1320a of FIG. 13) is given by Equation 11, where ω represents the phase difference between two consecutive chirps. Note that due to the dependency of λ in Equation 11, every sub-band will have an independent estimate of v. So, all the sub-band information is collated together in a manner to be able to make accurate measurements of the surrounding environment in real-time.

$$v = \frac{\lambda \omega}{4\pi T_{PRF}} \quad (11)$$

The corresponding angle of arrival θ of the target is given by Equation 12, where $P_k$ represents the received power on a subcarrier k of sub-band B, and F represents the mapping function that returns the beam pointing direction for a certain sub-carrier, for a given TTD configuration τ.

$$f_{max} = \max_{k \in B}\{P_k\}, \theta = \mathcal{F}(f_{max}, \tau) \quad (12)$$

The simulation pipeline 2200 provides an algorithm for estimating the range for a single channel based on transmitting a ZC sequence Z_tx 2202 at a frequency $f_c$. The signal is converted to a time domain signal 2204 via IFFT 2206. A cyclic prefix (CP) 2208 of 100% is added to produce a [z_tx, z_tx] signal 2210, which is then convolved 2212 with an impulse response having some finite delay through the channel 2214. At the receiver, a received signal 2218 is obtained from the channel 2214. Also at the receiver, a removal procedure 2220 removes the CP 2208, and the signal 2222 is converted to a frequency domain signal 2224 via FFT 2226. At the Z_correlator 2228, the signal 2224 is then correlated with the original signal Z_tx 2202. The output 2230 is subjected to an IFFT 2232 execution, which enables the simulation pipeline 2200 to calculate the delay 2232 through the channel in the time domain.

Figure 23:
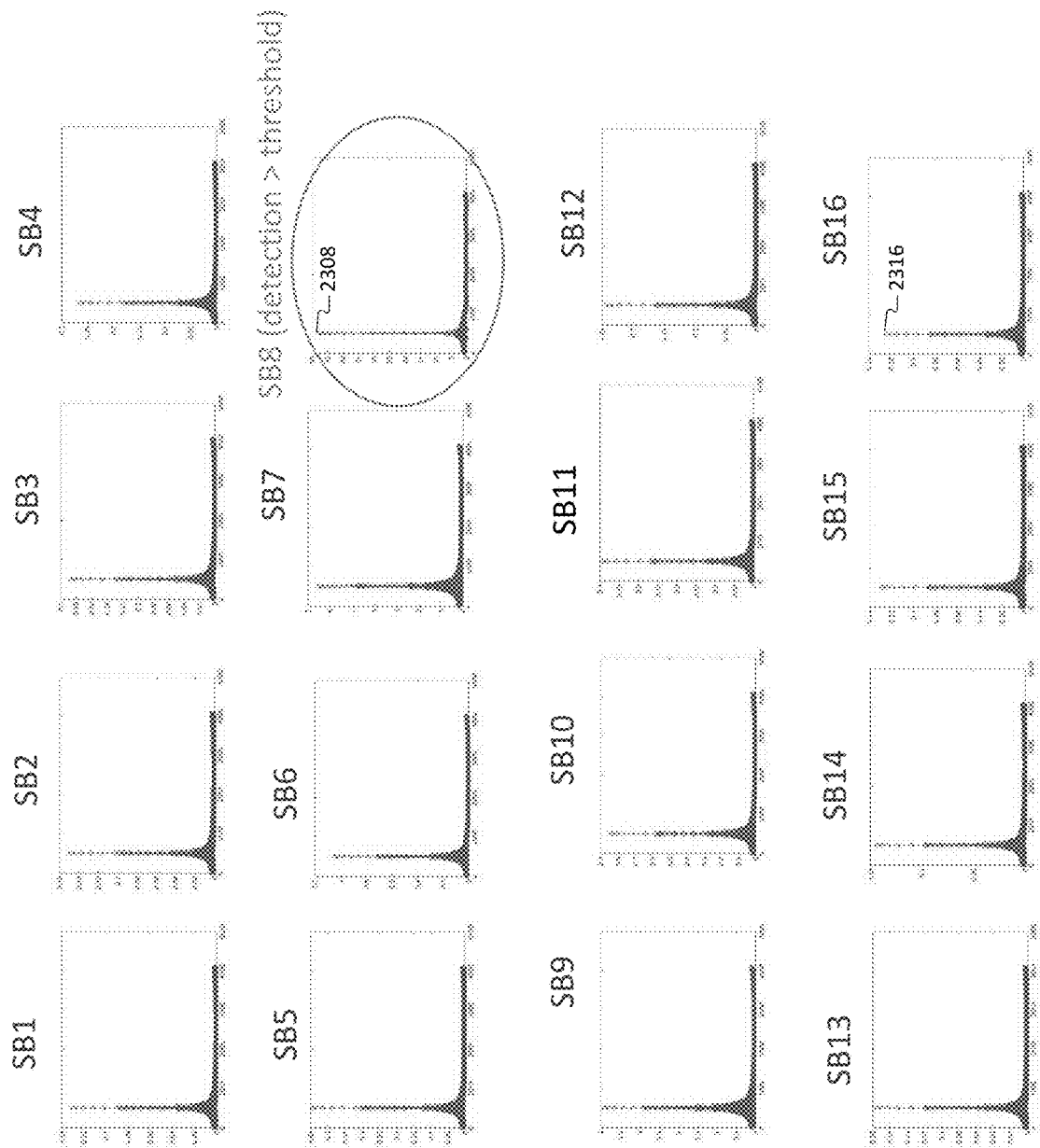
FIG. 23 illustrates 16 correlation outputs of a system enabled with TTD that received the 16 SFD beams, respectively, according to embodiments of this disclosure.

FIG. 23 illustrates 16 correlation outputs of a system enabled with TTD that received the 16 SFD beams (illustrated as SB 1 through SB 16), respectively. Each of the 16 correlation outputs represents the processed signal 2232 of FIG. 22 for a corresponding SFD beam. Each correlation output is compared with a detection threshold. As a particular example, the correlation output corresponding to SB8 has a peak 2308 (having a value between 45 and 50 on the y-axis) that is greater than or equal to the detection threshold and thereby satisfies a detection threshold condition. If a correlation output fails to satisfy the detection threshold condition, then no target object (e.g., 1320) is detected. As a particular example, the correlation output corresponding to SB 16 has a peak 2316 (having a value between 0.12 and 0.14 on the y-axis) that is less than the detection threshold and thereby fails to satisfy the detection threshold condition.

Figure 24:
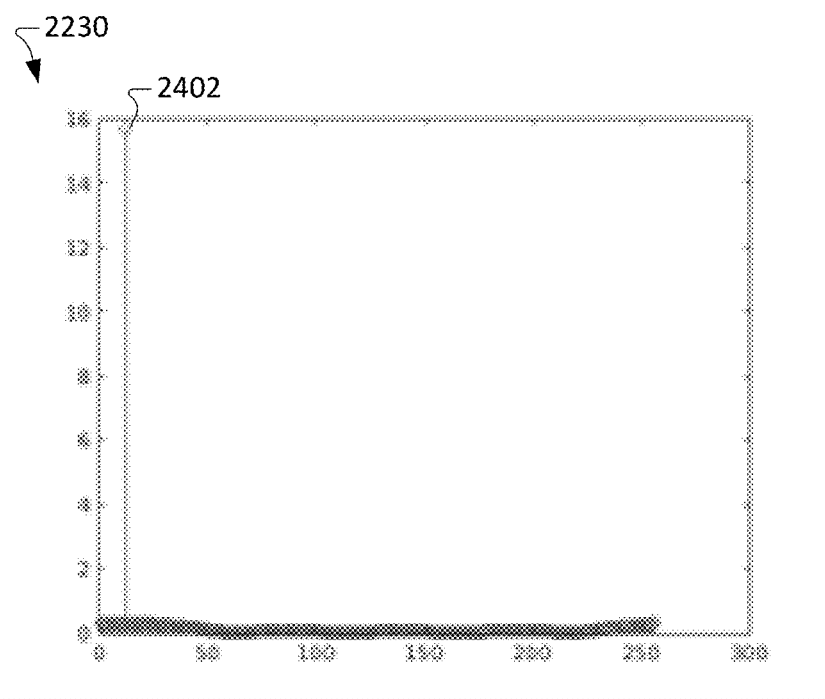
FIG. 24 illustrates the time-domain output after the IFFT of the Z_correlator of FIG. 22.

FIG. 24 illustrates the time-domain output 2232 after the IFFT of the Z_correlator 2228 of FIG. 22. This time-domain output 2232 outputs a single, sharp peak 2402 at a point corresponding to (e.g., with time equivalent to) the delay through the channel. In this embodiment, a Zadoff Chu sequence is used to estimate delay through the communication channel.

Figure 25:
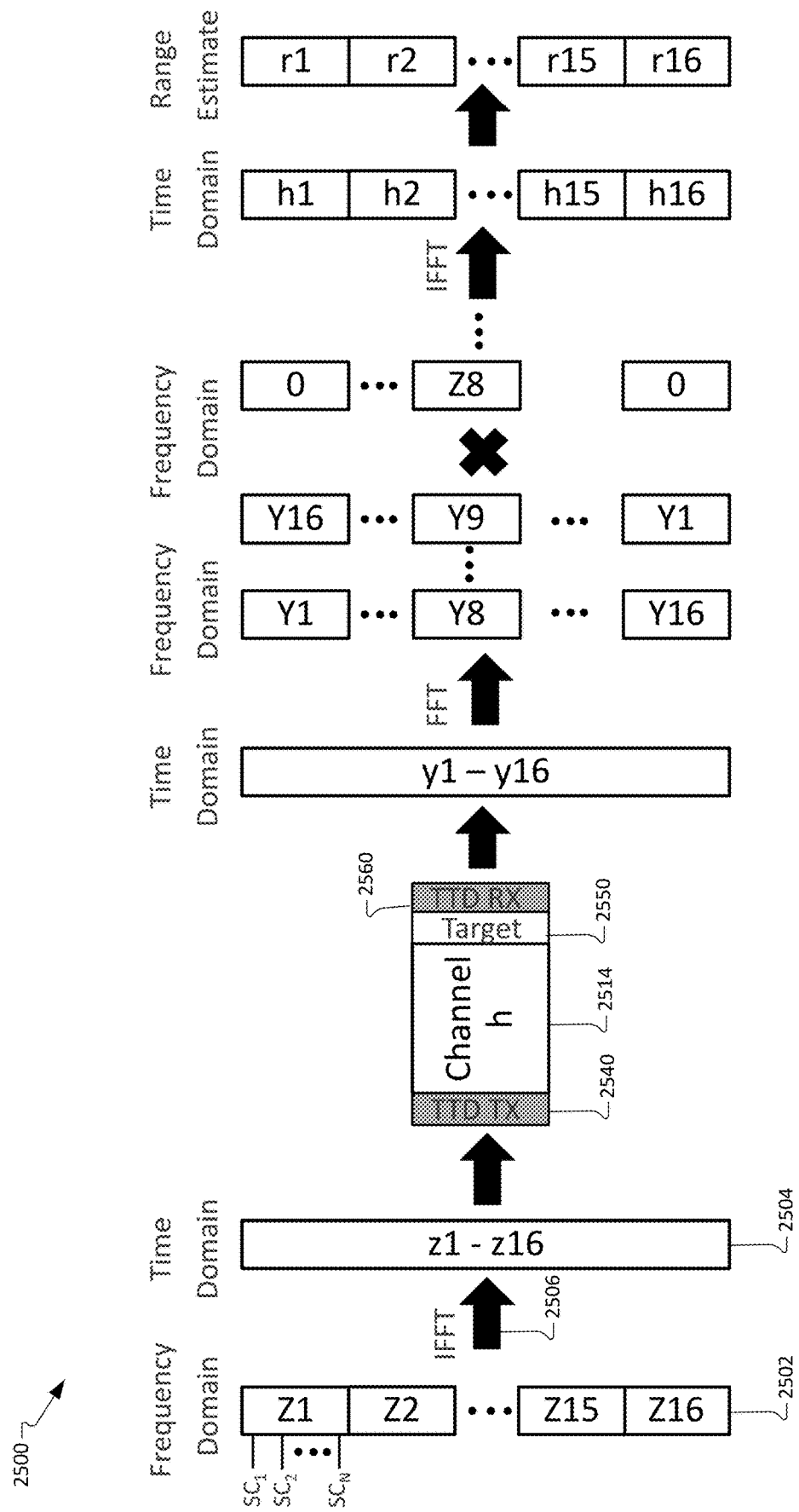
FIG. 25 illustrates a block diagram of a simulation pipeline for multiple sub-bands with TTD according to embodiments of this disclosure.

FIG. 25 illustrates a block diagram of a simulation pipeline 2500 for multiple sub-bands with TTD according to embodiments of this disclosure. The embodiment of the simulation pipeline 2500 shown in FIG. 25 is for illustration only, and other embodiments could be used without departing from the scope of this disclosure. The simulation pipeline 2500 provides an extension of the framework of the simulation pipeline 2200 of FIG. 22. Particularly, the simulation pipeline 2500 adds multiple ZC sequences at 16 different frequencies (for each sub-band). The transmitter side of the simulation pipeline 2500 includes the steps 2502, 2504, 2506, and 2514 that are the same as or similar to corresponding steps 2202, 2204, 2206, and 2214 in the TX simulation of the simulation pipeline 2200 of FIG. 22. The simulation pipeline 2500 adds a TTD component 2540 and transmits the signal (e.g., signal 2210 with the addition of the TTD component 2540) through the channel 2514. The simulation pipeline 2500 adds a component 2550 for the targets (e.g., target 420 of FIG. 4) followed by the TTD component 2560 at the receiver end. The other steps at the receiver side of simulation pipeline 2500 are similar to the receiver side of the simulation pipeline 2200 of FIG. 22.

Figure 26A:
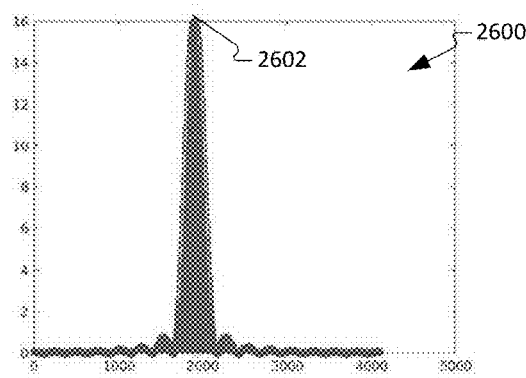
FIGS. 26A-26B and 27A-27D illustrate two sets of simulation results according to embodiments of this disclosure.
Figure 26B:
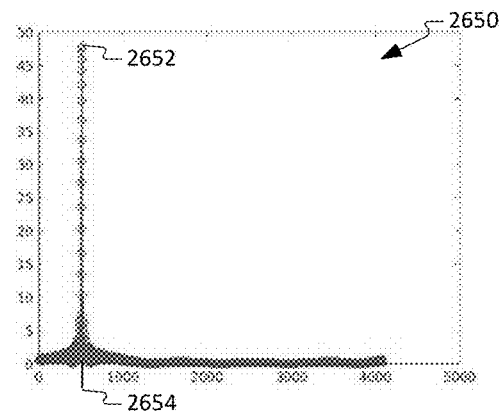

FIGS. 26A-26B and 27A-27D illustrate two sets of simulation results according to embodiments of this disclosure. In a first simulation, a single target is in the FoV of the TTD system 1100, as shown in FIGS. 26A-26B. In a second simulation, two targets are in the FoV of the TTD system 1100 at locations corresponding to different sub-bands, as shown in FIGS. 27A-27D.

FIG. 26A illustrates the results output 2600 of the first simulation after TTD RX (e.g., Z_rx_TTD that is illustrated as "y1-y16" in the time domain of FIG. 25). The results output 2600 includes one peak 2602 indicating the existence of one target. The angle of arrival of the target is calculated as according to Equation 11. FIG. 26B illustrates the output 2650 of the IFFT on the receiver side. The correlation peak 2652 corresponds to the distance 2654 of the target from the transceiver.

Figure 27A:
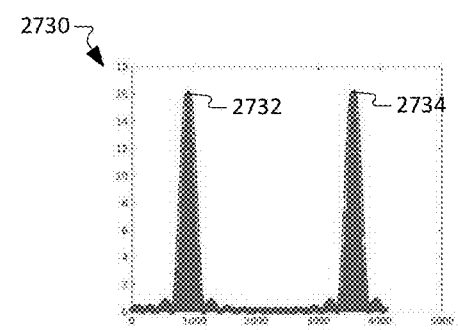
Figure 27B:
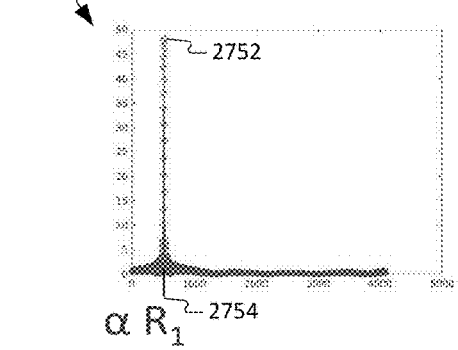
Figure 27C:
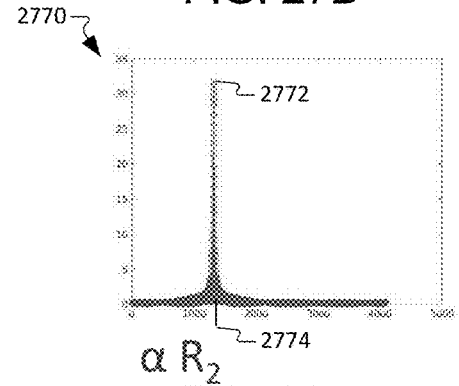
Figure 27D:
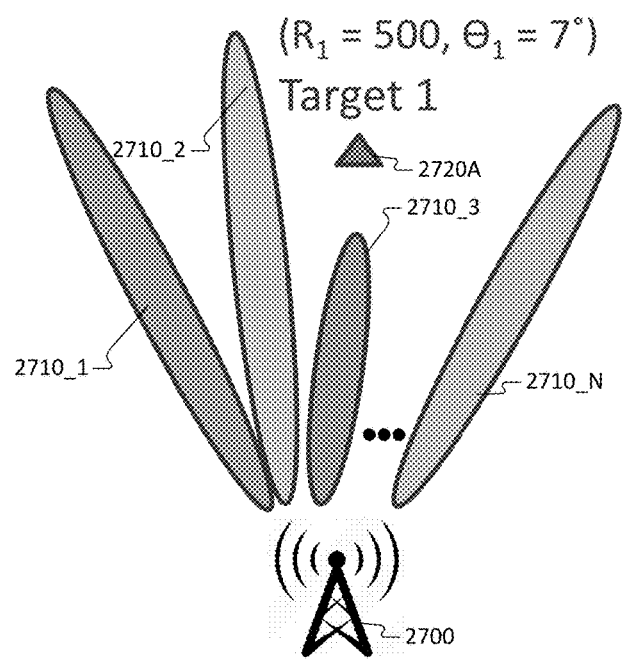

FIG. 27D illustrates the physical arrangement of the second simulation. The base station 2700 (e.g., gNB 102 of FIG. 2) includes the TTD system 1100 of FIG. 11A, the TTD compute system 1900 of FIG. 19, and a simulation pipeline (e.g., 2200 of FIG. 22 per SFD beam; or 2500 of FIG. 25). The base station 2700 simultaneously transmits a set of SFD beams 2710_1 through 2710_N at different frequencies $fc_i$. This disclosure is not limited to a SFD beams that have the equal bandwidths, for example, third SFD beam 2710_3 can have less bandwidth than the first SFD beam 2710_1, and the first SFD beam 2710_1 can have less bandwidth than the second SFD beam 2710_2. A first target 2720a is located at a distance $R_1$=500 and AoA $\theta_1$=7° from the transceiver of the base station 2700. A second target 2720b is located at a distance $R_2$=1300 and AoA $\theta_2$=−48° from the transceiver of the gNB 2700.

FIG. 27A shows the simulation results output 2730 of the second simulation after TTD RX. The results output 2730 includes two peak 2732 and 2734, which indicate the detection of two targets 2720a-2720b. FIGS. 27B and 27C illustrate the output 2750 and 2770 of the IFFT after correlation on the RX side. In FIG. 27B, the output 2750 includes a correlation peak 2752 corresponds to the distance 2754 (illustrated as the α$R_1$ value=500 on the x-axis, where a is a scalar constant) of the first target 2720a from the transceiver of the base station 2700. In FIG. 27C, the output 2770 includes a correlation peak 2772 corresponds to the distance 2774 (illustrated as the α$R_2$ value=1300 on the x-axis) of the second target 2720b from the transceiver of the base station 2700. Range and corresponding angle of arrivals can be calculated as described above in this disclosure.

Figure 28:
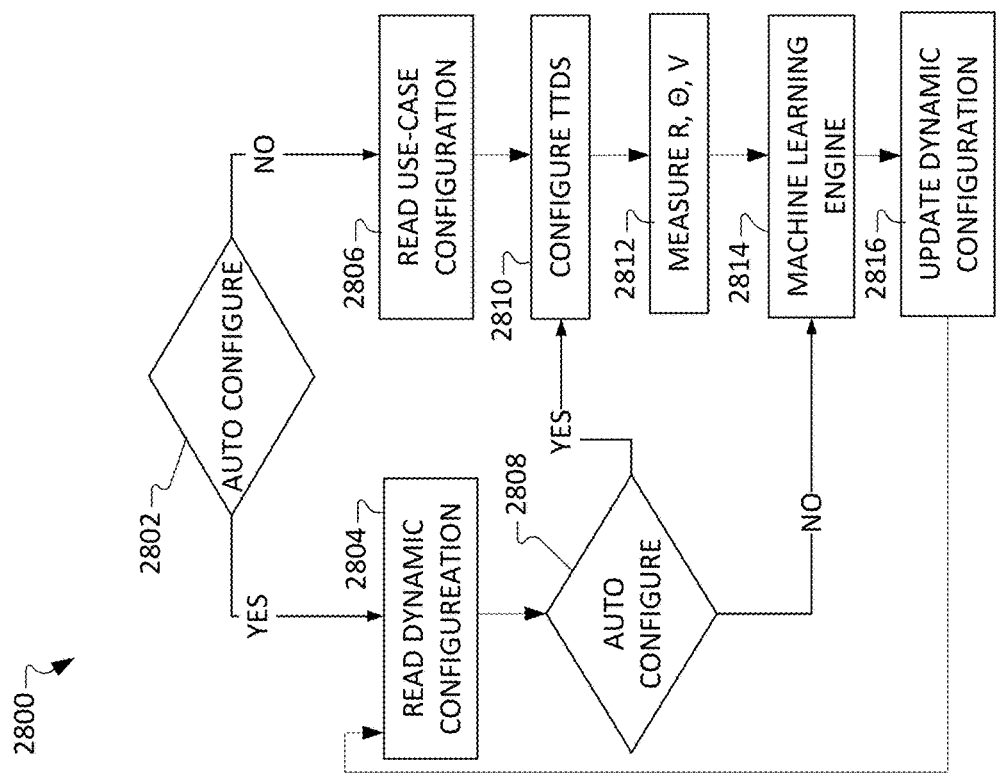
FIG. 28 illustrates a method of intelligent scheduling according to embodiments of this disclosure.

FIG. 28 illustrates a method 2800 of intelligent scheduling according to embodiments of this disclosure. The embodiment of the method 2800 shown in FIG. 28 is for illustration only, and other embodiments could be used without departing from the scope of this disclosure. The TTD-based compute system 1900 executes the method 2800 of intelligent scheduling of beams, in accordance with embodiments of this disclosure. The method 2800 will be described as being executed by the processor 225 of the gNB 102 of FIG. 2.

Different geographical locations need different sets of delay configurations. These settings may differ depending on the time of the day too. For example, a base-station (e.g., gNB 102) that is located near a busy highway (such as the highway shown in FIG. 13) may need to sense vehicular traffic all through the day, however another base station that is located near a residential area will have different workloads during the morning and different workloads during the evening. Different geographical locations will have different bandwidth needs at different time of the day. For example, a base-station located near an office area likely needs a lot of bandwidth during the day when people are traveling to and from workplaces, but limited bandwidth after office hours. Another base-station located near a highway, might have high demand during peak hours only, such as when a large number of people are traveling. These varied patterns of demand can be learned over time (e.g., via machine learning), and the TTD settings can be configured to provide optimum bandwidth to customers in that zone. Intelligent scheduling techniques are setup within the TTD-based compute system 1900 to exploit the complete benefits of TTD based sensing.

Embedded within the TTD-based compute system 1900 is a machine learning engine 2814 that implements various machine learning techniques to identify patterns and then schedule different configurations based on the workload demands. The machine learning techniques could identify a geographical pattern in which the workload demand of a residential area is different from the workload demand of a highway area. At the base station near the busy highway, the set of TTD elements 1140 may be configured with true time delay settings that are customized to sense vehicular traffic throughout 24 hours of the day. The machine learning techniques could identify a time of day pattern in which workload demand during rush hour (e.g., weekday mornings, when vehicular traffic is heavy) is greater than the workload demand during evenings and weekends. At the base station near the residential area, the set of TTD elements 1140 may be configured with true time delay settings that are customized to sense vehicular traffic during rush hour.

At block 2802, the processor 225 determines whether to automatically configure the TTD system 1100, including configuring phase shifters 1130 and TTD elements 1140 with TTD settings, to generate and simultaneously transmit a set of SFD beams. The method proceeds to block 1204 in response to a determination to perform to automatic configuring, or alternatively, the method proceeds to block 2806 in response to a determination not to perform to automatic configuring. At block 2804, the processor 225 reads a dynamic configuration. At block 2808, processor 225 makes a second determination of whether to automatically configure the TTD system 1100. The method proceeds to block 2810 in response to a determination to perform to automatic configuring. At block 2810, the processor 225 configures the TTD elements 1140 based on the dynamic configuration read. Alternatively, in response to a determination not to perform to automatic configuring, the method proceeds to the machine learning engine at block 2814.

At block 2806, the processor 225 reads a use-case configuration. At block 2810, after reading the use-case configuration, the processor 225 configures the TTD elements 1140 based on the use-case configuration read. At block 2812, the processor measures the range R, angle of arrival θ, and velocity v of each identified target. At block 2814, the processor 225 accesses a machine learning engine, including processing the measured range R, angle of arrival θ, and velocity v of each identified target through the machine learning engine. At block 2816, the processor 225 updates the dynamic configuration, and then the method 2800 proceeds to block 2804.

Figure 29:
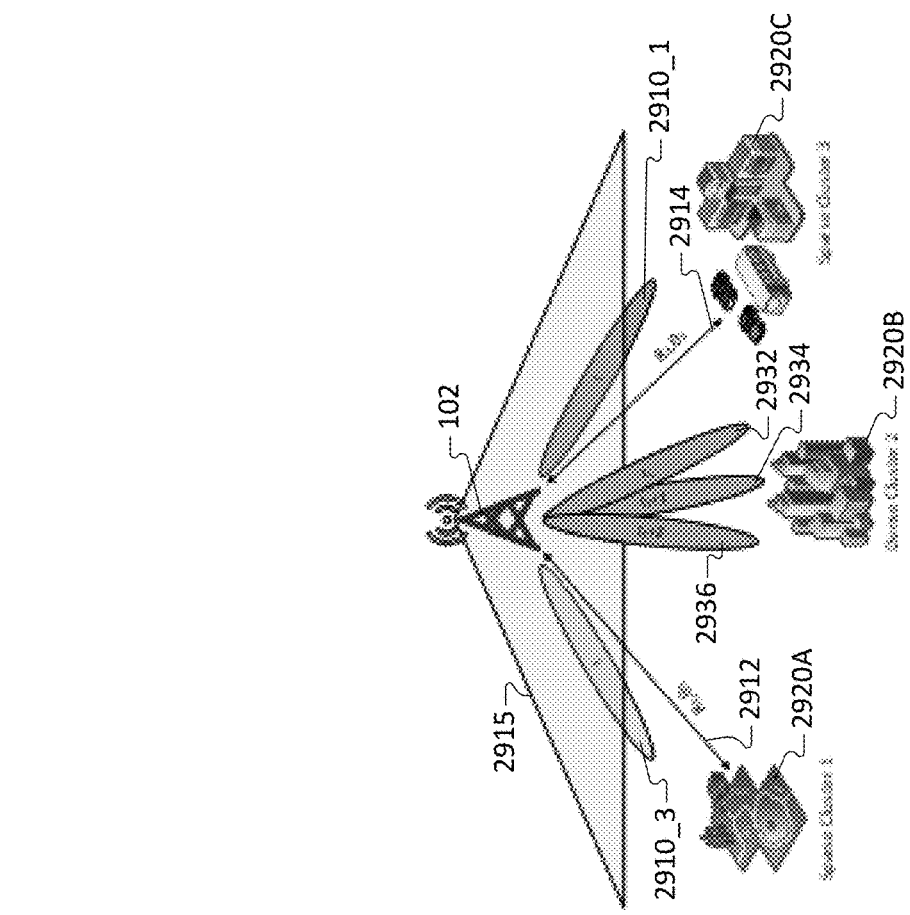
FIG. 29 illustrates a gNB 102 in an environment where the gNB implements the method of intelligent scheduling of FIG. 28 and implements the method of allocating bandwidth based on density of a spatial cluster target of FIG. 30.
Figures 30, 31:
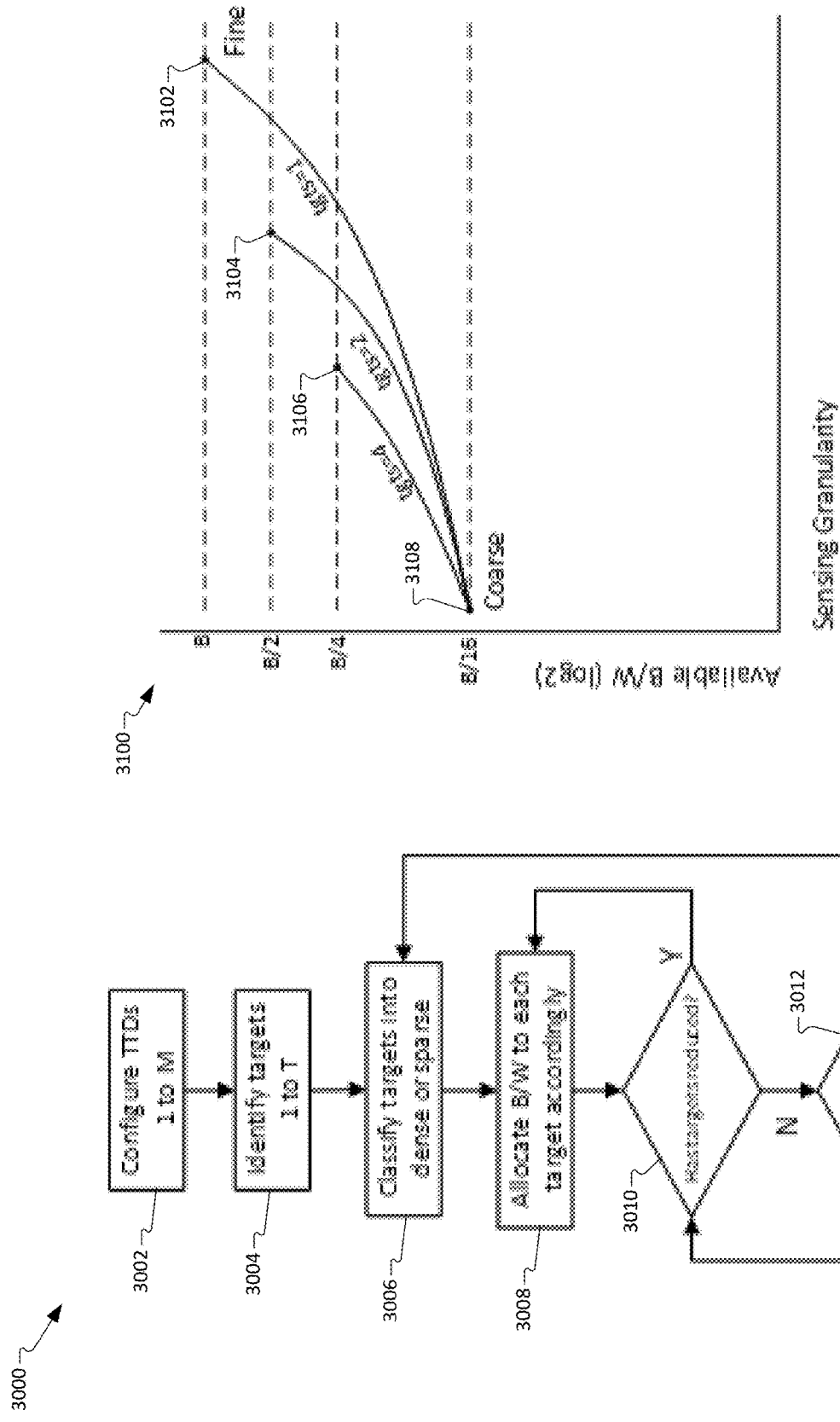
FIG. 30 illustrates the method of allocating bandwidth based on density of a spatial cluster target, in accordance with embodiments of this disclosure.
FIG. 31 illustrates a bandwidth allocation tradeoff, in accordance with embodiments of this disclosure.

FIG. 29 illustrates a gNB 102 in an environment where the gNB implements the method 2800 of intelligent scheduling of FIG. 28 and the method 3000 of allocating bandwidth based on density of a spatial cluster target FIG. 30. In FIG. 29, various sparse and dense geo-locations (including target clusters 2920) are shown in different portions of the environment within the FoV 2915 of the gNB 102. Fine grained sensing is used at dense geo-location hotspots while in other sparse geo-locations, the gNB 102 defaults to using coarse-grained sensing using policy shown in the method 3000 of allocating bandwidth based on density of a spatial cluster target of FIG. 30. A first cluster 2920*a* is a sparse geo-location (e.g., a park with walkways and a pond) that is located within the portion of the environment where the third SFD beam 2910_3 is transmitted at time t. The first cluster 2920*a* is located at $R_1$, $\theta_1$ (illustrated as arrow 2912) from the transceiver of the gNB 102. A second cluster 2920*b* is a dense geo-location hotspot (e.g., office buildings close to each other in a downtown area) is located within the portion of the FoV 2915 where a second SFD beam is transmitted at time t. In order to scan the second target cluster 2920*b* at the fine granularity of Layer 2, the gNB 102 performs a beam switching procedure by transmitting first, second, and third TDM beams 2932, 2934, and 2936 at times $t_1$, $t_1+1$, and $t_1+2$, respectively using the TDM bandwidth. The second cluster 2920*b* is located at $R_2$, $\theta_2$ from the transceiver of the gNB 102. The third sparse cluster 2920*c* is located at $R_3$, $\theta_3$ (illustrated as arrow 2914) from the transceiver of the gNB 102.

FIG. 30 illustrates the method 3000 of allocating bandwidth based on density of a spatial cluster target, in accordance with embodiments of this disclosure. The method 3000 is executed by the gNB 102. At block 3002, the set of TTD elements 1140 (including TTDs 1 to M) are configured. At block 3004, a number T of targets 2920*a*-2920*c* are identified by executing the two layer hybrid sensing procedure. At block 3006, each of the identified targets is classified as (e.g., assigned to the class of) dense or sparse. At block 3008, the gNB allocates the total system bandwidth 1201 to each target according to the dense/sparse classification assigned. For example, for Layer 2 sensing, the gNB can select TTD configuration settings that utilize fine-grained scanning only for the dense targets 2920*b*. For example, for Layer 2 sensing, the gNB can select TTD configuration settings that repeat coarse-grained scanning only for the sparse targets 2920*a* and 2920*c*. Some TTD configuration settings skip Layer 2 sensing of the sparse targets 2920*a* and 2920*c*. At block 3010, the gNB determines whether the number T of targets 2920 is reduced. For example, a vehicular/mobile target could exit (e.g., move out of) the FoV 2915 after being identified by the hybrid sensing procedure. If the number of targets is reduced, the method 3000 returns to block 3008 to reallocate the bandwidth 1201. At block 3012, in response to a determination that the number of targets is not reduced, the gNB determines whether the number T of targets 2920 is increased. As an example, a vehicular/mobile target could enter of the FoV 2915. If the number of targets is increased, the method 3000 returns to block 3006, but if the number of targets is not increased, the method 3000 returns to block 3010.

Figure 32:
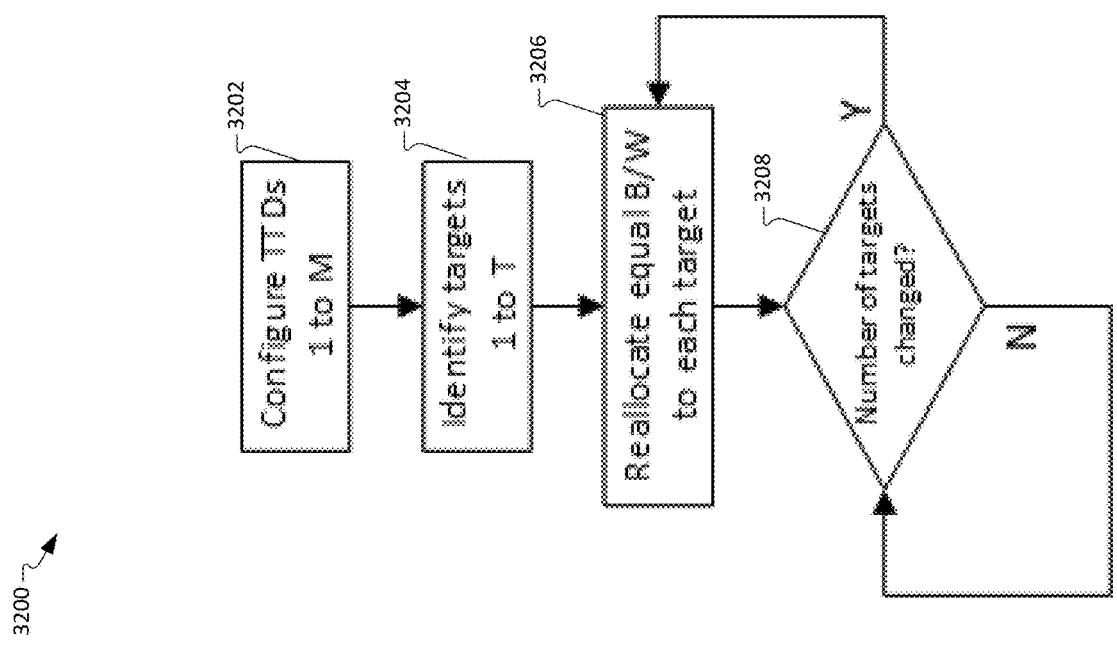
FIG. 32 illustrates a method of allocating bandwidth based on a bandwidth tradeoff policy, in accordance with embodiments of this disclosure.

FIGS. 31 and 32 illustrate a bandwidth allocation tradeoff 3100 and method 3200 of allocating bandwidth based on a bandwidth tradeoff policy, respectively. In FIGS. 31 and 32, the number of targets identified is illustrated as "tgts" and also referred to as T, and an equal bandwidth is allocated to each target.

Referring to FIG. 31, once one or more targets are quickly identified using TTD elements to transmit SFD beams to for Layer 1 sensing, the processor 225 of the gNB 102 sweeps through various delay values, providing more and more bandwidth to the target(s). An increase in number of identified targets reduces the bandwidth allocated to each target. For example, FIG. 31 shows a first bandwidth allocation 3102 at which fine-granularity scanning occurs, which is when the total system bandwidth (B) is allocated to a single target (i.e., tgts=1). However, second, third, and fourth bandwidth allocations 3104, 3106, and 3108 each show that fine-granularity scanning is not achieved when a half (B/2), a quarter (B/4), or a sixteenth (B/16) of the total system bandwidth is allocated to each of 2, 4, or 16 targets, respectively. When the number of identified targets is greater than 4, coarse granularity scanning is selected, for example, as shown by the fourth bandwidth allocation 3108. Some of these targets may eventually move out of the FoV (as shown by the Yes path from block 3208 of FIG. 32), and the TTD elements 1140 can be reconfigured to allocate additional bandwidth to the remaining targets.

FIG. 32 illustrates the method 3200 of allocating bandwidth based on a bandwidth tradeoff policy, according to embodiments of this disclosure. At block 3202, the processor 225 of the gNB 102 configures TTDs 1-M. At block 3204, each of T targets are identified. At block 3206, the processor 225 reallocates equal bandwidth to each identified target. At block 3208, the processor 225 determines whether the number of identified targets changed. If yes, the method 3200 returns to block 3206. If not, the method 3200 repeats block 3208.

Figure 33:
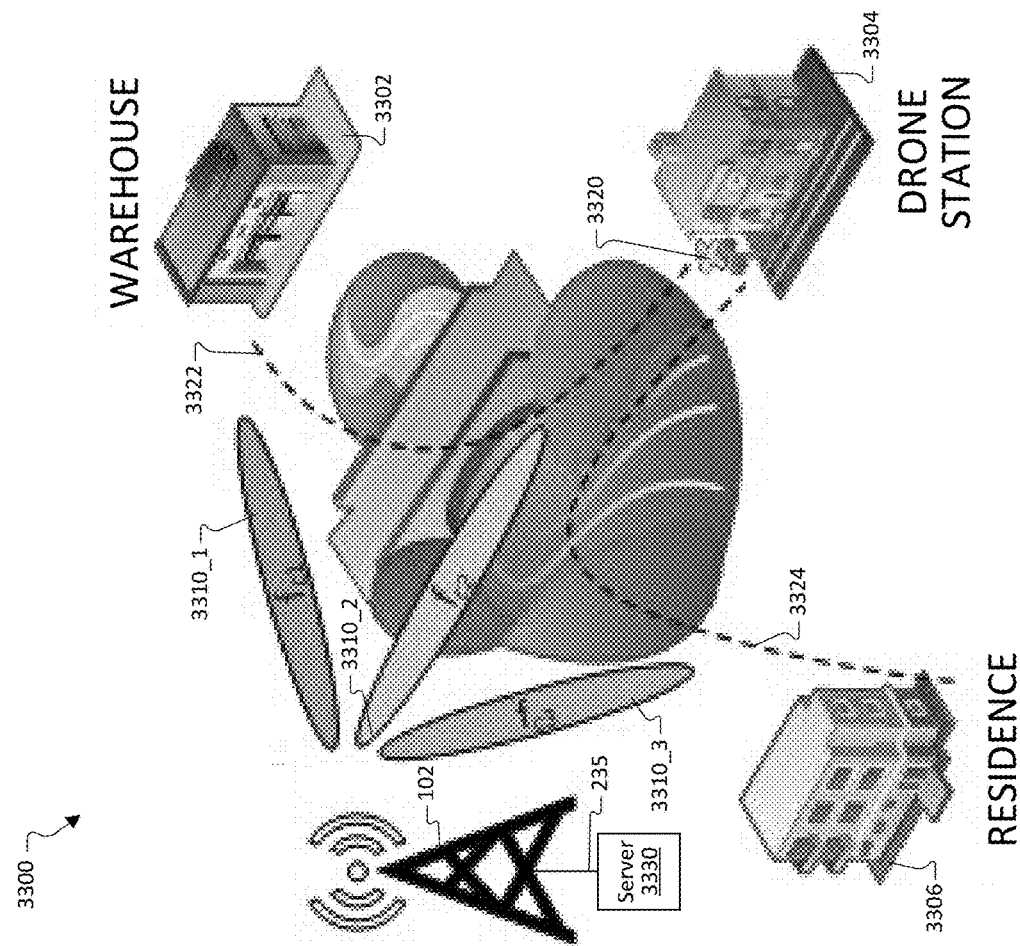
FIG. 33 illustrates a drone delivery service system 3300 according to embodiments of this disclosure.

FIG. 33 illustrates a drone delivery service system 3300 according to embodiments of this disclosure. The embodiment of the system 3300 shown in FIG. 33 is for illustration only, and other embodiments could be used without departing from the scope of this disclosure. The drone delivery service system 3300 include the gNB 102 that simultaneously transmits first, second, and third SFD beams 3310_1, 3310_2, 3310_3 in different directions at different frequencies of $f_{c1}$, $f_{c2}$, and $f_{c3}$, respectively. To track the location of a drone 3320, the drone delivery service system 3300 executes the methods of Real-time Thz Sensing using True Time Delay described in this disclosure. The drone delivery service system 3300 can operate in an urban area that includes a warehouse 3302, drone station 3304, and residential building 3306 that are located in portions of the field of view of the gNB 102 scanned by the SFD beams 3310_1, 3310_2, 3310_3, respectively. The customer, who is serviced by the system 3300 at frequency $f_{c3}$, places an order for a product through a mobile application. Based on the order, a request is registered in a backend server 3330 serviced at frequency $f_{c2}$. The request for deliver indicates the warehouse 3302 as a pick-up location and the residential building 3306 as a delivery location. Once a drone 3320 has been assigned for pickup and delivery, a notification is sent to the customer (e.g., via the mobile application) regarding approximate time of arrival of the purchased product stored in the warehouse 3302 serviced at frequency fa. Real-time updates are made available to the customer regarding the status of the order.

As the drone 3320 flies around, based on the pickup and delivery trajectories 3322 and 3324, its coordinates are constantly communicated to the backend server 3330. These updates could happen once every few minutes. The gNB 102 that is in the vicinity of the drone 3320 is able to accurately localize (e.g., determine coordinates of the location of) the drone via range, velocity, and AoA measurements, and is able to relay this R, v, θ information to the backend server 3330. Using TDM beam-switching techniques, there would be large overheads involved as explained above, and also a possibility of losing track of the drone 3320. However, by employing the drone delivery service system 3300, including the TTD system 1100 according to embodiments of this disclosure, the drone 3320 could be localized very quickly, and its location tracked as it is flying since many sub-beams (e.g., rainbow beam 1200) can be activated at the same time. Also, at specific instances, such as at pickup and delivery checkpoints, the gNB 102 can get centimeter-specific range resolution by reconfiguring the TTD elements 1140.

Figure 34:
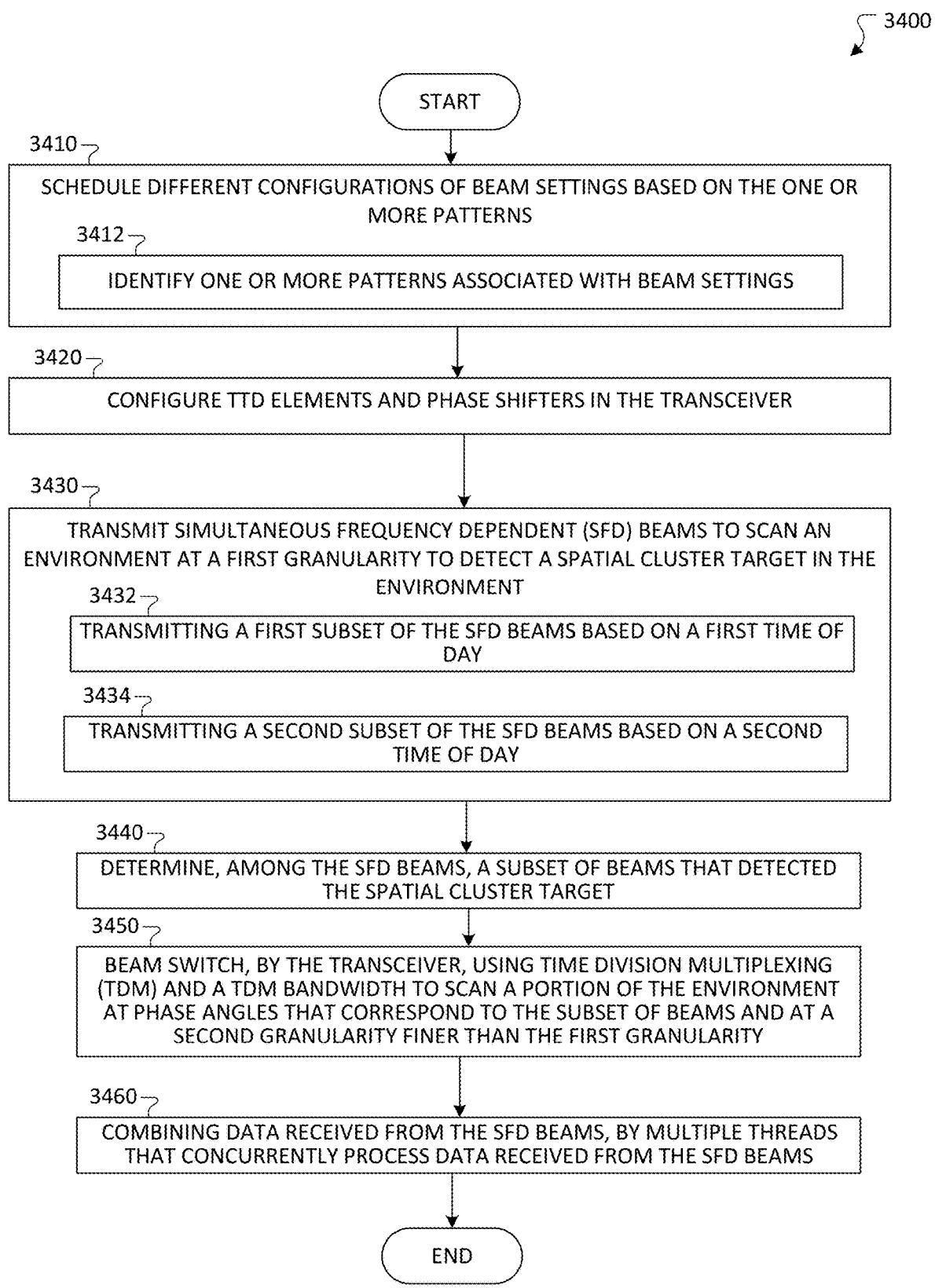
FIG. 34 illustrates a method for real-time THz sensing using true time delay in accordance with an embodiment of this disclosure.

FIG. 34 illustrates a method 3400 for real-time THz sensing using true time delay in accordance with an embodiment of this disclosure. The embodiment of the method 3400 shown in FIG. 34 is for illustration only, and other embodiments could be used without departing from the scope of this disclosure. The method 3400 is implemented by an electronic device, such as the gNB 102 or UE 116. More particularly, the method 3400 could be performed by a processor 225 of the gNB.

At block 3410, the processor 225 schedules different configurations of beam settings based on the one or more patterns. At block 3412, to schedule different configurations of beam settings, the processor 225 identifies one or more patterns associated with beam settings. Additional details regarding intelligent scheduling are described above with FIGS. 28-30. At block 3420, the processor 225 configure TTD elements 1140 and phase shifters 1130 in the transceiver.

At block 3430, the processor 225 transmits, via the transceiver, SFD beams to scan an environment at a first granularity (e.g., coarse granularity) to detect a spatial cluster target in the environment. At block 3432, transmitting the SFD beams includes transmitting a first subset of the SFD beams based on a first time of day. At block 3434, transmitting the SFD beams includes transmitting a second subset of the SFD beams based on a second time of day different from the first time of day.

At block 3440, the processor 225 determines, among the SFD beams, a subset of beams that detected the spatial cluster target. At block 3450, the processor 225 performs beam switching, via the transceiver, using time division multiplexing (TDM) and a TDM bandwidth to scan a portion of the environment at phase angles that correspond to the subset of beams and at a second granularity finer than the first granularity. At block 3460, the processor 225 combines data 1930 received from the SFD beams, by multiple threads 1924a-1924p that concurrently process data received from the SFD beams.

Although FIG. 34 illustrates an example method for real-time THz sensing using true time delay, various changes may be made to FIG. 34. For example, while shown as a series of steps, various steps in FIG. 34 could overlap, occur in parallel, occur in a different order, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of operating a base station, the method comprising:
    transmitting, by a transceiver that includes true time delay (TDD) elements and phase shifters configured in the transceiver, simultaneous frequency dependent (SFD) beams to scan an environment at a first granularity to detect a spatial cluster target in the environment, wherein each of the SFD beams corresponds to a different phase angle and different frequency;
    determining, among the SFD beams, a subset of beams that detected the spatial cluster target;
    beam switching, by the transceiver, using time division multiplexing (TDM) and a TDM bandwidth to scan a portion of the environment at phase angles that correspond to the subset of beams and at a second granularity finer than the first granularity, wherein each of the scan at the first granularity and the scan at the second granularity includes performing radar functions based on reflections from the spatial cluster target; and
    combining data received from the SFD beams, by multiple threads that concurrently process data received from the SFD beams.

2. The method of claim 1, wherein the TDM bandwidth is at least one of:
    greater than a bandwidth of any of the SFD beams, or
    a maximum bandwidth.

3. The method of claim 1, wherein the SFD beams include equivalent bandwidths as each other.

4. The method of claim 1, wherein the SFD beams include a first beam having a first bandwidth and a second beam having a second bandwidth different from the first bandwidth.

5. The method of claim 1, wherein:
    the spatial cluster target is detected having a velocity (v) and a location that is at a distance R and an angle Θ from the transceiver; and
    the SFD beams include:
        a first beam that corresponds to a first range of phase angles; and
        a second beam that corresponds a second range of phase angles, wherein the second range of phase angles includes more phase angles than the first range of phase angles.

6. The method of claim 1, further comprising:
    identifying one or more patterns associated with beam settings; and
    scheduling different configurations of beam settings based on the one or more patterns.

7. The method of claim 1, wherein transmitting the SFD beams comprises:
    transmitting a first subset of the SFD beams based on a first time of day; and
    transmitting a second subset of the SFD beams based on a second time of day.

8. An electronic device comprising:
    a transceiver comprising true time delay (TDD) elements and phase shifters;
    a processor operably coupled to the transceiver, the processor configured to:
        transmit, via the transceiver, simultaneous frequency dependent (SFD) beams to scan an environment at a first granularity to detect a spatial cluster target in the environment, wherein each of the SFD beams corresponds to a different phase angle and different frequency;
        determine, among the SFD beams, a subset of beams that detected the spatial cluster target;
        beam switch, via the transceiver, using time division multiplexing (TDM) and a TDM bandwidth to scan a portion of the environment at phase angles that correspond to the subset of beams and at a second granularity finer than the first granularity, wherein to perform each of the scan at the first granularity and the scan at the second granularity, the processor is further configured to perform radar functions based on reflections from the spatial cluster target; and
        combine data received from the SFD beams, by multiple threads that concurrently process data received from the SFD beams.

9. The electronic device of claim 8, wherein the TDM bandwidth is at least one of:
    greater than a bandwidth of any of the SFD beams, or
    a maximum bandwidth.

10. The electronic device of claim 8, wherein the SFD beams include equivalent bandwidths as each other.

11. The electronic device of claim 8, wherein the SFD beams include a first beam having a first bandwidth and a second beam having a second bandwidth different from the first bandwidth.

12. The electronic device of claim 8, wherein:
    the spatial cluster target is detected having a velocity (v) and a location that is at a distance R and an angle Θ from the transceiver; and
    the SFD beams include:
        a first beam that corresponds to a first range of phase angles; and
        a second beam that corresponds a second range of phase angles, wherein the second range of phase angles includes more phase angles than the first range of phase angles.

13. The electronic device of claim 8, wherein the processor is further configured to:
  identify one or more patterns associated with beam settings; and
  schedule different configurations of beam settings based on the one or more patterns.

14. The electronic device of claim 8, wherein to transmit the SFD beams, the processor is further configured to:
  transmit a first subset of the SFD beams based on a first time of day; and
  transmit a second subset of the SFD beams based on a second time of day.

15. A non-transitory, computer readable medium embodying a computer program, the computer program comprising program code that, when executed by a processor of an electronic device, causes the electronic device to:
  transmit, by a transceiver that includes true time delay (TDD) elements and phase shifters configured in the transceiver, simultaneous frequency dependent (SFD) beams to scan an environment at a first granularity to detect a spatial cluster target in the environment, wherein each of the SFD beams corresponds to a different phase angle and different frequency;
  determine, among the SFD beams, a subset of beams that detected the spatial cluster target;
  beam switch, by the transceiver, using time division multiplexing (TDM) and a TDM bandwidth to scan a portion of the environment at phase angles that correspond to the subset of beams and at a second granularity finer than the first granularity, wherein the program code that, when executed, causes the electronic device to perform each of the scan at the first granularity and the scan at the second granularity, further causes the electronic device to perform radar functions based on reflections from the spatial cluster target; and
  combine data received from the SFD beams, by multiple threads that concurrently process data received from the SFD beams.

16. The non-transitory, computer readable medium of claim 15,
  wherein the TDM bandwidth is at least one of:
  greater than a bandwidth of any of the SFD beams, or a maximum bandwidth.

17. The non-transitory computer readable medium of claim 15, wherein the SFD beams include equivalent bandwidths as each other.

18. The non-transitory, computer readable medium of claim 15, wherein:
  the spatial cluster target is detected having a velocity (v) and a location that is at a distance R and an angle Θ from the transceiver; and
  the SFD beams include a first beam having a first bandwidth and a second beam having a second bandwidth different from the first bandwidth.

19. The non-transitory, computer readable medium of claim 15, wherein the program code that, when executed, causes the electronic device to:
  identify one or more patterns associated with beam settings; and
  schedule different configurations of beam settings based on the one or more patterns.

20. The non-transitory, computer readable medium of claim 15, wherein the program code that, when executed, causes the electronic device to transmit the SFD beams further comprises program code that, when executed, causes the electronic device to:
  transmit a first subset of the SFD beams based on a first time of day; and
  transmit a second subset of the SFD beams based on a second time of day.

* * * * *